(12) United States Patent
Prichard et al.

(10) Patent No.: US 8,079,784 B2
(45) Date of Patent: Dec. 20, 2011

(54) MILLING CUTTER AND MILLING INSERT WITH COOLANT DELIVERY

(75) Inventors: Paul D. Prichard, Greensburg, PA (US); Linn R. Andras, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 12/903,480

(22) Filed: Oct. 13, 2010

(65) Prior Publication Data
US 2011/0033250 A1 Feb. 10, 2011

Related U.S. Application Data

(62) Division of application No. 11/654,833, filed on Jan. 18, 2007, now Pat. No. 7,963,729.

(51) Int. Cl.
*B23C 5/28* (2006.01)
*B23B 27/10* (2006.01)

(52) U.S. Cl. .......................... 407/11; 407/113; 407/114

(58) Field of Classification Search .............. 407/33–37, 407/40, 43–46, 49, 120, 107, 2, 6, 102, 113–11; 408/56, 57
See application file for complete search history.

(56) References Cited

U.S. PATENT DOCUMENTS

| | | |
|---|---|---|
| 2,870,523 A | 1/1959 | Richard |
| 3,077,802 A | 2/1963 | Philip |
| 3,323,195 A | 6/1967 | Vanderjagt |
| 3,429,700 A | 2/1969 | Wiegand et al. |
| 3,486,378 A | 12/1969 | Carlson |
| 3,561,299 A | 2/1971 | Brisk et al. |
| 3,571,877 A | 3/1971 | Zerkle |
| 3,798,726 A | 3/1974 | Dudley |
| 3,889,520 A | 6/1975 | Stoferle et al. |
| 3,971,114 A | 7/1976 | Dudley |
| 4,012,061 A | 3/1977 | Olson |
| 4,123,194 A | 10/1978 | Cave |
| 4,204,787 A | 5/1980 | McCray et al. |
| 4,276,085 A | 6/1981 | Wisell |
| 4,437,800 A | 3/1984 | Araki et al. |
| 4,508,183 A | 4/1985 | Drummond et al. |
| 4,535,216 A | 8/1985 | Cassidenti |
| 4,579,488 A | 4/1986 | Griffin |
| 4,682,916 A | 7/1987 | Briese |

(Continued)

FOREIGN PATENT DOCUMENTS

DE 3004166 C2 2/1980

(Continued)

OTHER PUBLICATIONS

A.S.T.M. Tool Engineers Handbook McGraw Hill Book Co. New York, NY (1949) pp. 302-315.

(Continued)

*Primary Examiner* — Boyer D Ashley
*Assistant Examiner* — Sara Addisu
(74) *Attorney, Agent, or Firm* — Larry R. Meenan

(57) ABSTRACT

A cutting insert for use in chipforming and material removal from a workpiece wherein coolant is supplied to the cutting insert from a coolant source. The cutting insert includes at least one discrete cutting location and at least one distinct internal channel that corresponds to the cutting location. The internal channel has an inlet to receive coolant and an outlet to exit coolant. The outlet is proximate to the cutting location, and the inlet is radial inward of the outlet.

12 Claims, 17 Drawing Sheets

U.S. PATENT DOCUMENTS

| | | | |
|---|---|---|---|
| 4,813,831 A | 3/1989 | Reinauer | |
| 4,848,198 A | 7/1989 | Royal et al. | |
| 4,861,203 A | 8/1989 | Bassett et al. | |
| 4,880,461 A | 11/1989 | Lichida | |
| 4,880,755 A | 11/1989 | Mehrotra | |
| 4,881,431 A | 11/1989 | Bieneck | |
| 4,955,264 A | 9/1990 | Ambrust | |
| 5,024,976 A | 6/1991 | Mehrotra et al. | |
| 5,148,728 A | 9/1992 | Mazurkiewicz | |
| 5,163,790 A | 11/1992 | Vig | |
| RE34,180 E | 2/1993 | Nemeth et al. | |
| 5,222,843 A | 6/1993 | Katbi et al. | |
| 5,237,894 A | 8/1993 | Lindeke | |
| 5,252,119 A | 10/1993 | Nishida et al. | |
| 5,265,985 A | 11/1993 | Boppana et al. | |
| 5,275,633 A | 1/1994 | Johansson et al. | |
| 5,288,186 A | 2/1994 | Kovacevic | |
| 5,290,135 A | 3/1994 | Ball et al. | |
| 5,316,323 A | 5/1994 | Jovanovic | |
| 5,333,520 A | 8/1994 | Fischer et al. | |
| 5,346,335 A | 9/1994 | Harpaz et al. | |
| 5,388,487 A | 2/1995 | Danielsen | |
| 5,439,327 A | 8/1995 | Wertheim | |
| 5,516,242 A | 5/1996 | Andronica | |
| 5,525,134 A | 6/1996 | Mehrotra | |
| 5,542,792 A | 8/1996 | Krueger et al. | |
| 5,554,338 A | 9/1996 | Sugihara et al. | |
| 5,565,156 A | 10/1996 | Ingelstrom | |
| 5,707,185 A | 1/1998 | Mizutani | |
| 5,718,156 A | 2/1998 | Lagrolet et al. | |
| 5,733,075 A | 3/1998 | Basteck | |
| 5,761,974 A | 6/1998 | Wang et al. | |
| 5,775,854 A | 7/1998 | Wertheim | |
| 5,816,753 A | 10/1998 | Hall | |
| 5,826,469 A | 10/1998 | Haradem | |
| 5,829,331 A | 11/1998 | Mori | |
| 5,901,623 A | 5/1999 | Hong | |
| 5,955,186 A | 9/1999 | Grab | |
| 5,975,817 A | 11/1999 | Komine | |
| 6,010,283 A | 1/2000 | Heinrich et al. | |
| 6,045,300 A | 4/2000 | Antoun | |
| 6,050,756 A | 4/2000 | Bucholz et al. | |
| 6,053,669 A | 4/2000 | Lageberg | |
| 6,056,486 A | 5/2000 | Colvin | |
| 6,117,533 A | 9/2000 | Inspektor | |
| 6,124,040 A | 9/2000 | Kolaska et al. | |
| 6,164,169 A | 12/2000 | Goff | |
| 6,287,058 B1 | 9/2001 | Arai et al. | |
| 6,287,682 B1 | 9/2001 | Grab et al. | |
| 6,299,388 B1 | 10/2001 | Slabe | |
| 6,312,199 B1 | 11/2001 | Sjoden et al. | |
| 6,322,746 B1 | 11/2001 | LaSalle et al. | |
| 6,350,510 B1 | 2/2002 | Konig et al. | |
| 6,394,709 B1 | 5/2002 | Sjoo et al. | |
| 6,443,672 B1 | 9/2002 | Lagerberg | |
| 6,447,218 B1 | 9/2002 | Lagerberg | |
| 6,447,890 B1 | 9/2002 | Leverenz et al. | |
| 6,450,738 B1 | 9/2002 | Ripley | |
| 6,471,448 B1 | 10/2002 | Lagerberg | |
| 6,521,349 B1 | 2/2003 | Konig et al. | |
| 6,528,171 B1 | 3/2003 | Endler et al. | |
| 6,551,551 B1 | 4/2003 | Gegel et al. | |
| 6,575,672 B1 | 6/2003 | Maier | |
| 6,595,727 B2 | 7/2003 | Arvidsson | |
| 6,634,835 B1 | 10/2003 | Smith | |
| 6,637,984 B2 | 10/2003 | Murakawa et al. | |
| 6,648,565 B2 | 11/2003 | Schweizer | |
| 6,652,200 B2 | 11/2003 | Kraemer | |
| 6,705,805 B2 | 3/2004 | Lagerberg | |
| 6,708,590 B2 | 3/2004 | Lagerberg | |
| 6,769,335 B2 | 8/2004 | Kaminski | |
| 6,860,172 B2 | 3/2005 | Hecht | |
| 6,884,449 B2 | 4/2005 | Penich et al. | |
| 6,905,992 B2 | 6/2005 | Mehrotra | |
| 6,913,428 B2 | 7/2005 | Kress et al. | |
| 6,957,933 B2 | 10/2005 | Pachao-Morbitzer et al. | |
| 6,998,173 B2 | 2/2006 | Liu et al. | |
| 7,094,717 B2 | 8/2006 | Yeckley | |
| 7,125,205 B2 | 10/2006 | Sheffler | |
| 7,125,207 B2 | 10/2006 | Craig et al. | |
| 7,160,062 B2 | 1/2007 | Tran | |
| 7,252,024 B2 | 8/2007 | Zurecki et al. | |
| 7,273,331 B2 | 9/2007 | Giannetti | |
| 7,309,466 B2 | 12/2007 | Heinrich et al. | |
| 7,396,191 B2 | 7/2008 | Fujimoto et al. | |
| 7,407,348 B2 | 8/2008 | Sjogren et al. | |
| 7,510,352 B2 | 3/2009 | Craig | |
| 7,530,769 B2 | 5/2009 | Kress et al. | |
| 7,621,700 B2 | 11/2009 | Jonsson et al. | |
| 7,634,957 B2 | 12/2009 | Ghosh et al. | |
| 7,641,422 B2 | 1/2010 | Berminge et al. | |
| 7,687,156 B2 | 3/2010 | Fang et al. | |
| 2001/0007215 A1 | 7/2001 | Murata et al. | |
| 2002/0106250 A1 | 8/2002 | Murakawa et al. | |
| 2003/0017014 A1 | 1/2003 | Morgulis et al. | |
| 2003/0082018 A1 | 5/2003 | Kraemer | |
| 2003/0095841 A1 | 5/2003 | Kraemer | |
| 2004/0240949 A1 | 12/2004 | Pachao-Morbitzer et al. | |
| 2005/0186039 A1 | 8/2005 | Muller et al. | |
| 2006/0140728 A1 | 6/2006 | Giannetti | |
| 2006/0171837 A1 | 8/2006 | Heinrich et al. | |
| 2006/0263153 A1 | 11/2006 | Isaksson | |
| 2008/0175676 A1 | 7/2008 | Prichard | |
| 2008/0175677 A1 | 7/2008 | Prichard et al. | |
| 2008/0175678 A1 | 7/2008 | Prichard | |
| 2008/0175679 A1 | 7/2008 | Prichard | |
| 2008/0240872 A1* | 10/2008 | Rimet | 407/51 |
| 2011/0020072 A1* | 1/2011 | Chen et al. | 407/11 |

FOREIGN PATENT DOCUMENTS

| | | |
|---|---|---|
| DE | 3429842 A1 | 2/1986 |
| DE | 3740814 A1 | 12/1987 |
| EP | 100376 A2 | 2/1984 |
| EP | 0599393 B1 | 2/1996 |
| EP | 0932460 B1 | 6/2003 |
| FR | 1279749 | 1/1961 |
| FR | 2244590 | 9/1973 |
| JP | 5669007 A2 | 6/1981 |
| JP | 60127904 A | 7/1985 |
| JP | 04183503 A2 | 6/1992 |
| JP | 05301104 | 11/1993 |
| JP | 06083205 U | 11/1994 |
| JP | 07227702 A2 | 8/1995 |
| JP | 07237006 | 9/1995 |
| JP | 08025111 A | 1/1996 |
| JP | 08039387 | 2/1996 |
| JP | 08039387 A | 2/1996 |
| JP | 09262706 A | 10/1997 |
| JP | 10094904 A2 | 4/1998 |
| JP | 2000280106 A | 10/2000 |
| JP | 2001113408 A | 4/2001 |
| JP | 2001239420 A | 9/2001 |
| JP | 2003053622 A | 2/2003 |
| JP | 2003266207 A2 | 9/2003 |
| JP | 2003266208 A2 | 9/2003 |
| JP | 2004122262 A | 4/2004 |
| JP | 2005279900 A2 | 10/2005 |
| JP | 06136953 A | 6/2006 |
| KR | 1020060027154 A | 3/2006 |
| KR | 1020060054916 A | 5/2006 |
| WO | 0076697 A2 | 12/2000 |
| WO | 0158632 A1 | 8/2001 |

OTHER PUBLICATIONS

Moltrecht, K.H. Machine Shop Practice, Industrial Press Inc. New York, NY (1981) pp. 199-204.

Santhanam et al. "Cemented Carbides", Metals Handbook, vol. 2, 10th Edition, Properties and Selection, ASM International (1990) pp. 950-977.

Wertheim et al., "Influence of High-Pressure Flushing through the Rake Face of a Cutting Tool", Annuals of the CIRP, vol. 41/1 (1992) pp. 101-106.

* cited by examiner

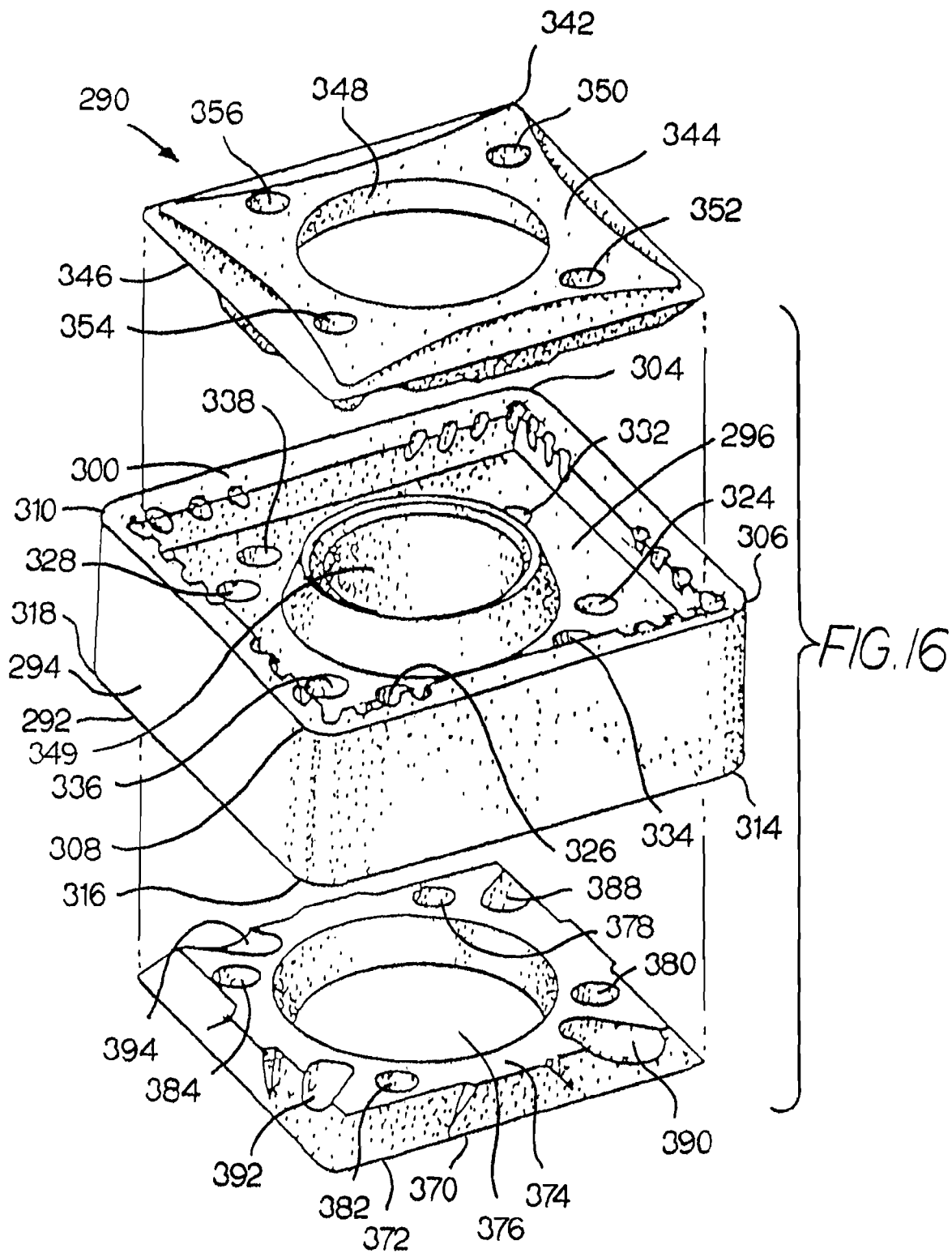

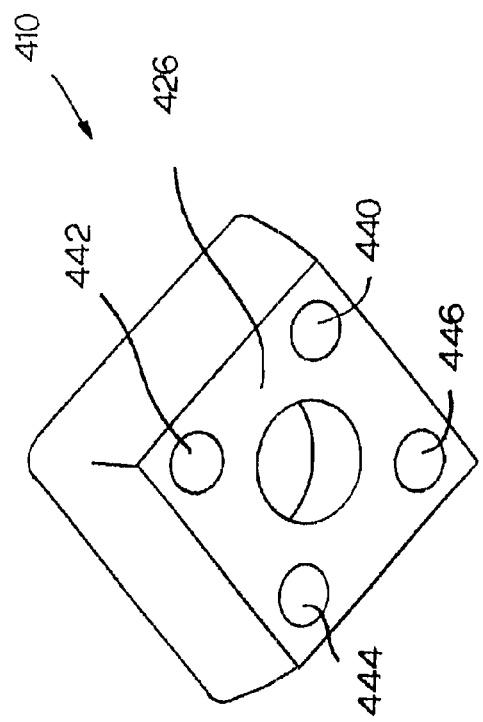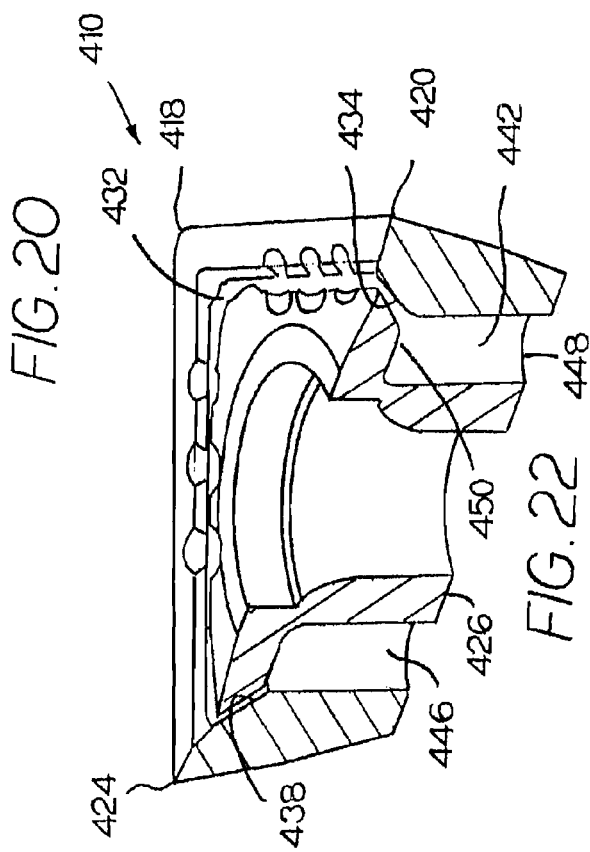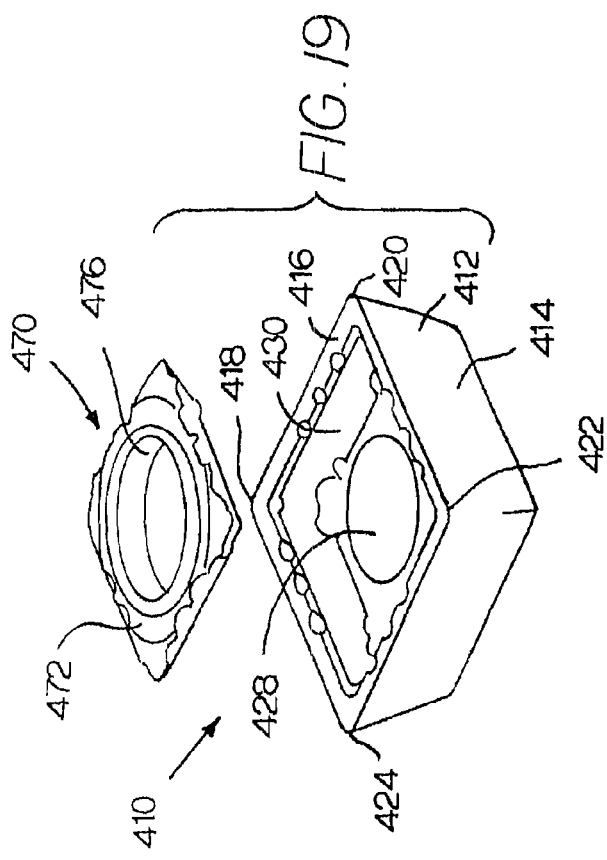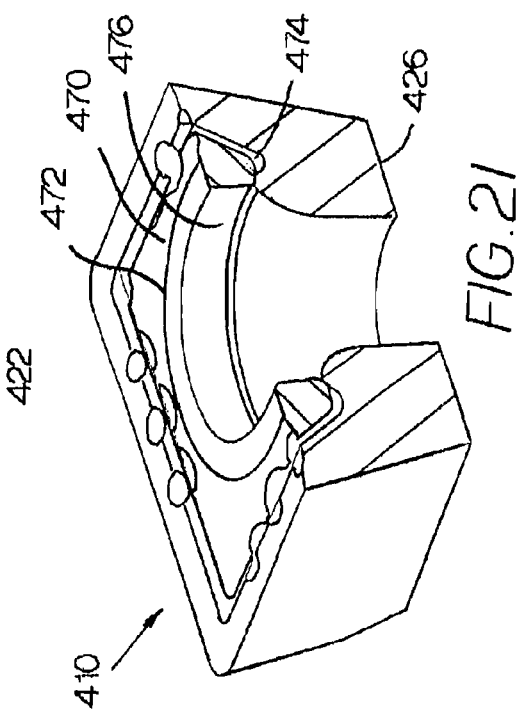

MILLING CUTTER AND MILLING INSERT WITH COOLANT DELIVERY

CROSS-REFERENCE TO EARLIER PENDING PATENT APPLICATION

This patent application is a divisional patent application of co-pending U.S. patent application Ser. No. 11/654,833 filed Jan. 18, 2007 for a MILLING CUTTER AND MILLING INSERT WITH COOLANT DELIVERY by Paul D. Prichard and Linn R. Andras. Applicants (Paul D. Prichard and Linn R. Andras) hereby claim the benefit of the priority filing date of said above-referenced parent patent application (i.e., U.S. Ser. No. 11/654,833 filed Jan. 18, 2007). Further, applicants hereby incorporate by reference herein the entirety of said parent patent application (i.e., U.S. Ser. No. 11/654,833 filed Jan. 18, 2007).

BACKGROUND OF THE INVENTION

The invention relates to a milling cutter, as well as a milling insert, used for chipforming and material removal operations. More specifically, the invention pertains to a milling cutter, as well as a milling insert, used for chipforming and material removal operations wherein there is enhanced delivery of coolant adjacent the interface between the milling insert and the workpiece (i.e., the insert-chip interface) to diminish excessive heat at the insert-chip interface.

In a chipforming and material removal operation (e.g., a milling operation), heat is generated at the interface between the cutting insert and the location where the chip is removed from the workpiece (i.e., the insert-chip interface). It is well-known that excessive heat at the insert-chip interface can negatively impact upon (i.e., reduce or shorten) the useful tool life of the milling insert. As can be appreciated, a shorter useful tool life increases operating costs and decreases overall production efficiency. Hence, there are readily apparent advantages connected with decreasing the heat at the insert-chip interface.

In this regard, U.S. Pat. No. 6,053,669 to Lagerberg discusses the importance of reducing the heat at the insert-chip interface. More specifically, Lagerberg mentions that when the cutting insert is made from cemented carbide reaches a certain temperature, its resistance to plastic deformation decreases. A decrease in plastic deformation resistance increases the risk for breakage of the cutting insert. U.S. Pat. No. 5,775,854 to Wertheim points out that a rise in the working temperature leads to a decrease in hardness of the cutting insert with a consequent increase in wear of the cutting insert. Each one of the Lagerberg patent and the Wertheim patent discuss the importance of delivering coolant to the insert-chip interface.

Other patent documents disclose various ways to or systems for delivering coolant to the insert-chip interface. In this regard, U.S. Pat. No. 6,045,300 to Antoun discloses using high pressure and high volume delivery of coolant to address heat at the insert-chip interface. U.S. Patent Application Publication No. 2003/00820118 to Kreamer discloses grooves between the cutting insert and a top plate. Coolants flows through the grooves to address the heat at the insert-chip interface. U.S. Pat. No. 5,901,623 to Hong discloses a coolant delivery system for applying liquid nitrogen to the insert-chip interface.

It is readily apparent that in a chipforming and material removal operation, higher operating temperatures at the insert-chip interface can have a detrimental impact on the useful tool life through premature breakage and/or excessive wear. It therefore would be highly desirable to provide a cutter assembly (e.g., a milling cutter assembly), as well as a cutting insert (e.g., a milling insert), used for chipforming and material removal operations wherein there is an improved delivery of coolant to the interface between the milling insert and the workpiece (i.e., the insert-chip interface, which is the location on the workpiece where the chip is generated).

In a milling operation, the chip generated from the workpiece can sometimes stick (e.g., through welding) to the surface of the cutting insert (e.g., a milling insert). The build up of chip material on the cutting insert in this fashion is an undesirable occurrence that can negatively impact upon the performance of the cutting insert, and hence, the overall material removal operation.

Thus, it would be highly desirable to provide a cutting assembly (e.g., a milling cutter assembly), as well as a cutting inert (e.g., a milling insert), used for chipforming and material removal operations wherein there is enhanced delivery of coolant to the insert-chip interface so as to result in enhanced lubrication at the insert-chip interface. The consequence of enhanced lubrication at the insert-chip interface is a decrease in the tendency of the chip to stick to the cutting insert.

In a cutting operation such as, for example, a milling operation, there can occur instances in which the chips do not exit the region of the insert-chip interface when the chip sticks to the cutting insert. When a chip does not exit the region of the insert-chip interface, there is the potential that a chip can be re-cut. It is undesirable for the milling insert to re-cut a chip already removed from the workpiece. A flow of coolant to the insert-chip interface will facilitate the evacuation of chips from the insert-chip interface thereby minimizing the potential that a chip will be re-cut.

Hence, it would be highly desirable to provide a cutting assembly (e.g., a milling cutter assembly), as well as a cutting inert (e.g., a milling insert), used for chipforming and material removal operations wherein there is enhanced delivery of coolant to the insert-chip interface so as to reduce the potential that a chip will be re-cut. The consequence of enhanced flow of coolant to the insert-chip interface is better evacuation of chips from the vicinity of the interface with a consequent reduction in the potential to re-cut a chip.

SUMMARY OF THE INVENTION

In one form thereof, the invention is a cutting insert for use in chipforming and material removal from a workpiece wherein coolant is supplied to the cutting insert from a coolant source. The cutting insert includes at least one discrete cutting location and at least one distinct internal channel that corresponds to the cutting location. The internal channel has an inlet to receive coolant and an outlet to exit coolant. The outlet is proximate to the cutting location, and the inlet is radial inward of the outlet.

In another form thereof, the invention is a cutting insert for use in chipforming and material removal from a workpiece wherein coolant is supplied to the cutting insert from a coolant source. The cutting insert includes a cutting insert body that presents a plurality of discrete cutting locations. The cutting insert body contains a plurality of discrete depressions corresponding to one of the cutting locations and extending toward its corresponding one of the cutting locations. There is a diverter plate that has a central body with a top face and a bottom face, and a plurality of tapered flanges. The diverter plate is affixed to the cutting insert body wherein each one of the tapered flanges is received within a corresponding one of the discrete depressions so that each one of the discrete depressions and its corresponding one of the tapered flanges and a portion of the central body define one of a plurality of discrete internal channels. Each one of the discrete internal channels corresponds to one of the cutting locations. Each one of the internal channels has an outlet to exit coolant being proximate to the corresponding cutting location and an inlet to receive coolant being radial inward of the outlet.

In yet another form thereof, the invention is a cutting insert for use in chipforming and material removal from a workpiece wherein coolant is supplied to the cutting insert from a coolant source. The cutting insert includes a cutting insert body that presents at least one discrete cutting location. The cutting insert body contains at least one discrete depression that corresponds to the cutting location and extends toward the corresponding cutting location. There is a diverter plate that has a central body with a top face and a bottom face, and at least one tapered flange. The diverter plate is affixed to the cutting insert body wherein the tapered flange is received within the discrete depression so that the discrete depression and the corresponding tapered flange and a portion of the central body define at least one discrete internal channel that corresponds to the cutting location. The internal channel has an outlet to exit coolant that is proximate to the corresponding cutting location and an inlet to receive coolant being radial inward of the outlet.

In still another form thereof, the invention is a cutting insert for use in chipforming and material removal from a workpiece wherein coolant is supplied to the cutting insert from a coolant source. The cutting insert includes a mediate cutting insert body that defines a peripheral flank surface and a peripheral portion of opposite rake surfaces wherein the peripheral flank surface intersects the peripheral portion of the opposite rake surfaces to form discrete cutting locations. There is a pair of rake plates attached to the mediate cutting insert body wherein each one of the rake plates defines in part its corresponding one of the rake surfaces. The mediate cutting insert body and the rake plates together define a first group of a plurality of discrete internal channels and a second group of a plurality of discrete internal channels. Each one of the first group of discrete internal channels corresponds to one of the cutting locations at the intersection of one of the rake surfaces and the peripheral flank surface. Each one of the second group of discrete internal channels corresponds to one of the cutting locations at the intersection of other of the rake surfaces and the peripheral flank surface. Each one of the first group of the discrete internal channels has an inlet opening at the other of the rake surface and an outlet opening at the one rake surface adjacent to its corresponding cutting location. Each one of the second group of the discrete internal channels has an inlet opening at the one of the rake surface and an outlet opening at the other rake surface adjacent to its corresponding cutting location.

In still another form thereof, a milling cutter for use in chipforming and material removal from a workpiece wherein coolant is supplied to the milling cutter from a coolant source. The milling cutter includes a milling cutter body that contains a coolant reservoir and a pocket that has a pocket opening in communication with the coolant source. The milling cutter body contains a fluid passageway that provides fluid communication between the coolant reservoir and the pocket. There is a cutting insert that includes at least one discrete cutting location and at least one distinct internal channel that corresponds to the cutting location. The internal channel has an inlet to receive coolant and an outlet to exit coolant wherein the outlet is proximate to the cutting location and the inlet is radial inward of the outlet.

BRIEF DESCRIPTION OF THE DRAWINGS

The following is a brief description of the drawings that form a part of this patent application:

FIG. 16 is an isometric view of a second specific embodiment of the milling insert assembly wherein the top rake plate and bottom rake plate are exploded apart from the milling insert body;

FIG. 19 is an isometric view of another specific embodiment of a milling insert wherein the rake plate is exploded away from the milling insert body;

FIG. 20 is an isometric view of the specific embodiment of FIG. 19 showing the bottom surface and the peripheral flank surface of the milling insert;

FIG. 21 is a cross-sectional view of the milling insert of FIG. 19 with the rake plate assembled to the milling insert body;

FIG. 22 is a cross-sectional view of the milling insert of FIG. 19 with the rake plate assembled to the milling insert body;

DETAILED DESCRIPTION

Figure 1:
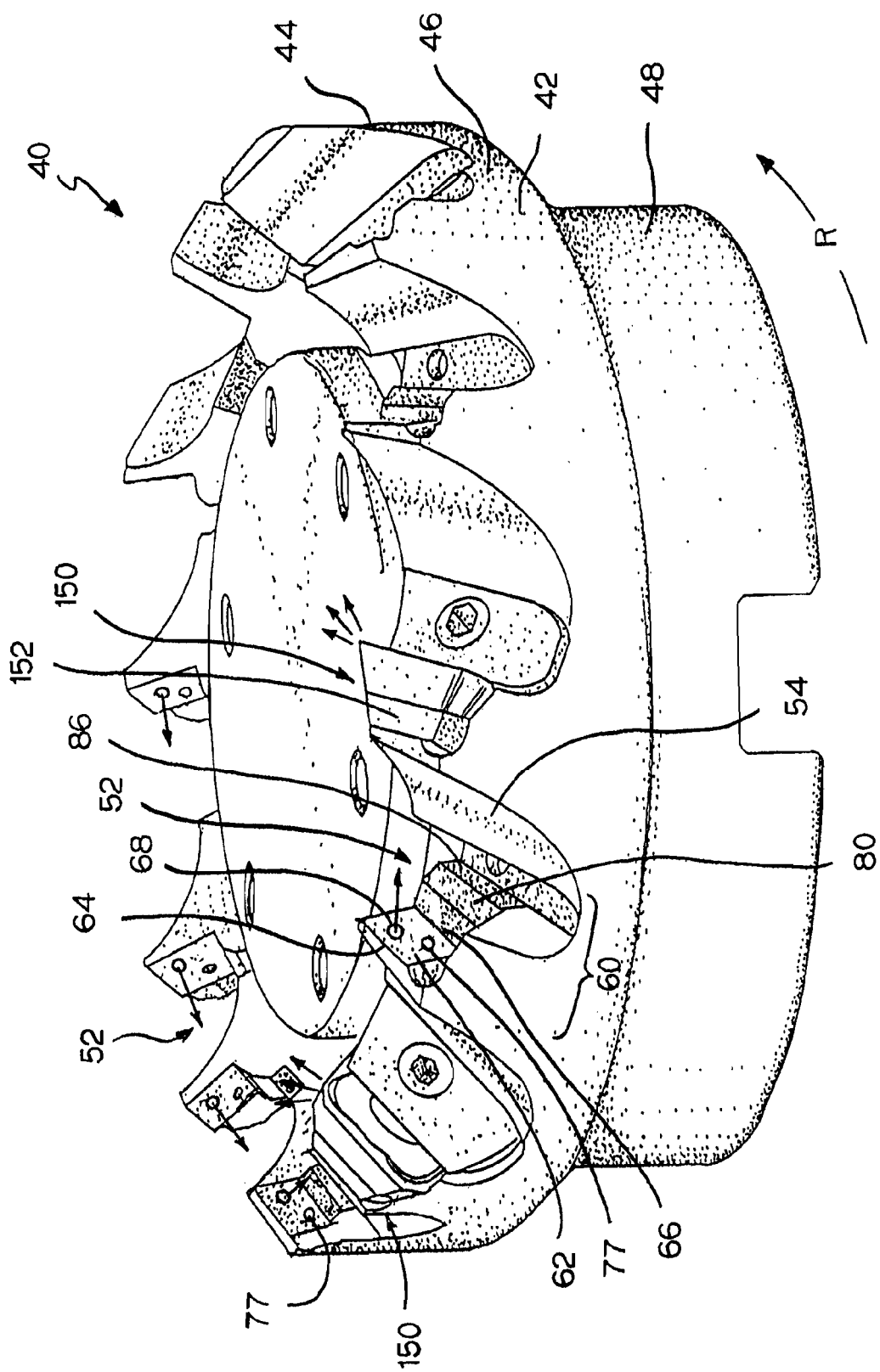
FIG. 1 is an isometric view of a specific embodiment of the milling cutter assembly of the invention wherein the milling cutter body presents pockets spaced about the circumference thereof, and wherein some of the pockets are shown being empty (i.e., without a milling insert assembly therein), and two of the pockets are show as containing a milling insert assembly with the flow of coolant shown by arrows.

Referring to the drawings, FIG. 1 illustrates a specific embodiment of the milling cutter assembly of the invention generally designated as 40 wherein the milling cutter assembly 40 is for use in chipforming and material removal operations. In such an operation, the material is removed from a workpiece. In operation, the milling cutter assembly 40 rotates in the direction indicated by the arrow "R".

Milling cutter assembly 40 includes a generally cylindrical milling cutter body generally designated as 42 that has a cutting rim 44 with a peripheral surface 46. Milling cutter 40 further includes a depending integral collar 48 that depends downward (as viewed in FIG. 1) from the cutting rim 44. In this specific embodiment, milling cutter assembly 40 further contains a plurality of spaced-apart pockets generally designated as 52 in the peripheral surface 46 of the cutting rim 44. As will be described in more detail hereinafter, each pocket 52 receives and securely retains a milling insert assembly therein.

It should be appreciated that the milling cutter body 42 may contain a number of pockets different from that shown in this specific embodiment. Further, it should also be appreciated that the spacing between the pockets may be different from that disclosed herein. In this regard, the number and position of the pockets can vary depending upon the specific application for the milling cutter assembly. Applicants do not intend to limit the scope of the invention to the specific geometry of the milling cutter body and orientation of the pockets therein such as those shown in the drawings herein.

Figure 2:
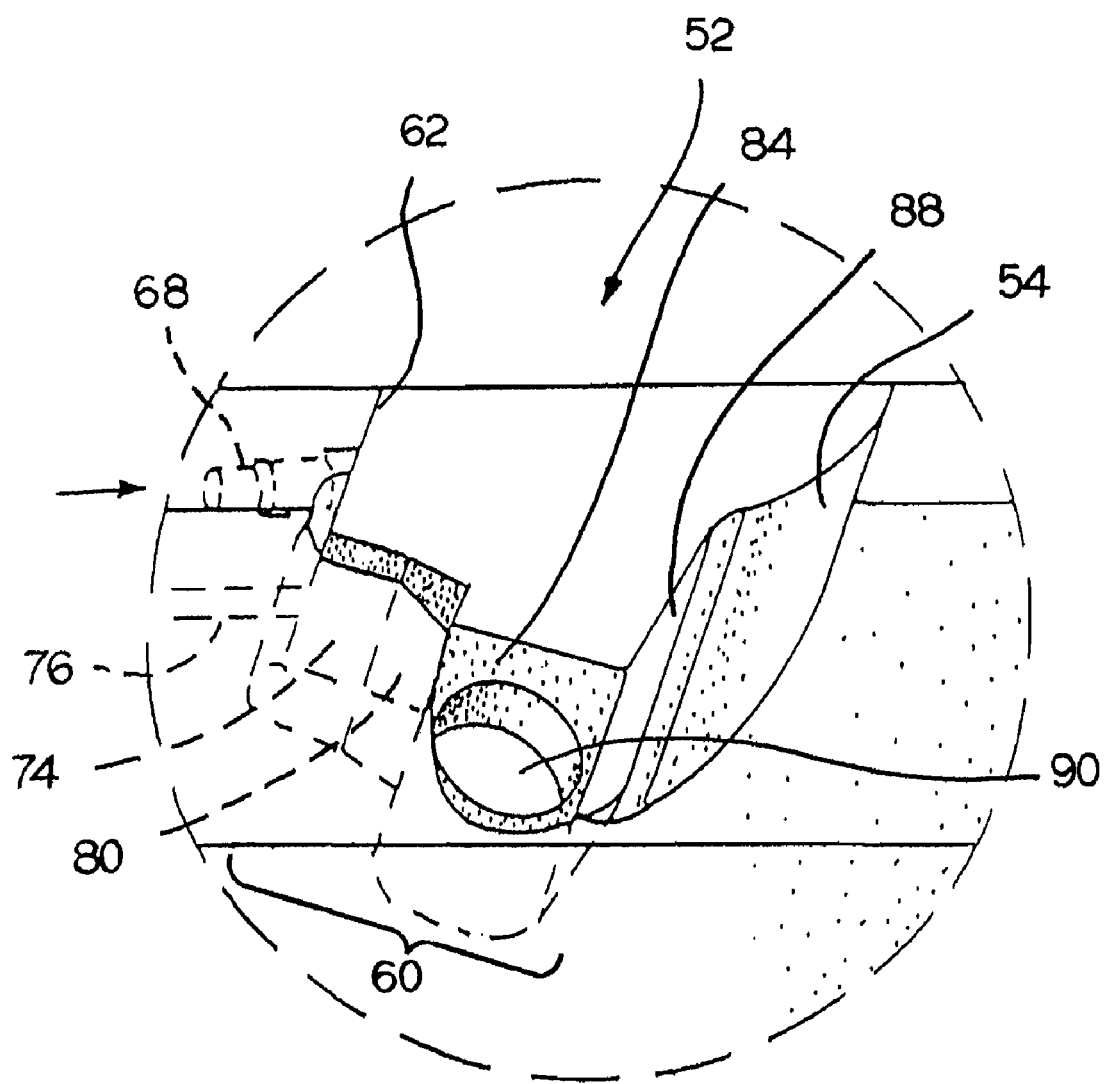
FIG. 2 is an isometric side view of one pocket contained in the cutting rim of the milling cutter body showing the leading concave surface and the seating section, and wherein the pocket is illustrated in the environment of the milling cutter body shown in phantom.

Each pocket 52 has a leading concave surface 54 and a seating section (see bracket 60 in FIGS. 1 and 2) that is contiguous with and trails the leading concave surface 54. A transition region 58 provides a transition between the concave surface 54 and the seating section 60. In the context of this invention, the terms "leading" and "trailing" (as well as like related terms) refer to the relative position of the structural aspects of the pocket and the milling insert assembly in reference to the operation of the milling cutter assembly. For example, in reference to the same component, a portion thereof that is "leading" is rotationally ahead of a portion thereof that is "trailing" during the operation of the milling cutter assembly. The use of these relative terms is not intended to be restrictive of the scope of the invention, but only to define the various features of the structure relative to one another.

The seating section 60 includes a seating surface 62 at the trailing end of the seating section 60. Seating surface 62 has a radial disposition and an axial disposition. Seating surface 62 has a top edge 64 and a bottom edge 66. The milling cutter body 42 contains a closed threaded bore 68 that has a termination in the seating surface 62. The threaded bore 68 receives a threaded fastener as described hereinafter. The use of the terms "top" and "bottom" and the like are in reference to the relative orientation of the structural components as shown in the position as illustrated in FIG. 1. The use of these relative terms is not intended to be restrictive of the scope of the invention, but only to define the various features of the structure relative to one another.

Seating section 60 further contains a trailing inclined seating surface 74 that joins the seating surface 62. The milling cutter body 42 contains a coolant passage 76 that opens at the trailing inclined seating surface 74 as shown by an opening 77. The opening 77 is offset from the geometric center of the seating surface 62 so as to register (or be in alignment) with a selected lobe of the central coolant passage of the milling insert depending upon the position of the milling insert in the pocket. This aspect of the invention will be described in more detail hereinafter.

The coolant passage 76 provides a conduit for the flow of coolant to the milling insert contained in the pocket as will be described hereinafter. The seating section 60 also contains a leading inclined seating surface 80 that is contiguous with the trailing inclined seating surface 74. When the milling insert assembly is retained within the pocket, the milling insert rests on (and is supported by) the leading inclined seating surface 80 and the shim rests on and is supported by the trailing inclined seating surface 74. It should be appreciated that the leading inclined seating surface 80 and the trailing inclined seating surface 74 have a radial disposition and an axial disposition.

The seating section 60 further includes a clamp seating surface 84 that is adjacent to the leading inclined seating surface 80. A shoulder 86 joins the leading inclined seating surface 80 with the clamp seating surface 84. Another shoulder 88 provides a transition between the clamp seating surface 84 and the transition 58. The clamp seating surface 84, as well as the shoulders 86 and 88, have a radial and an axial disposition. The milling cutter body 42 contains a threaded hole (or aperture) 90 that opens at the clamp seating surface 84. Threaded hole 90 is designed to receive a retention pin that passes through a clamp wherein the clamp assists to securely retain the shim and milling insert in the pocket.

Figure 3:
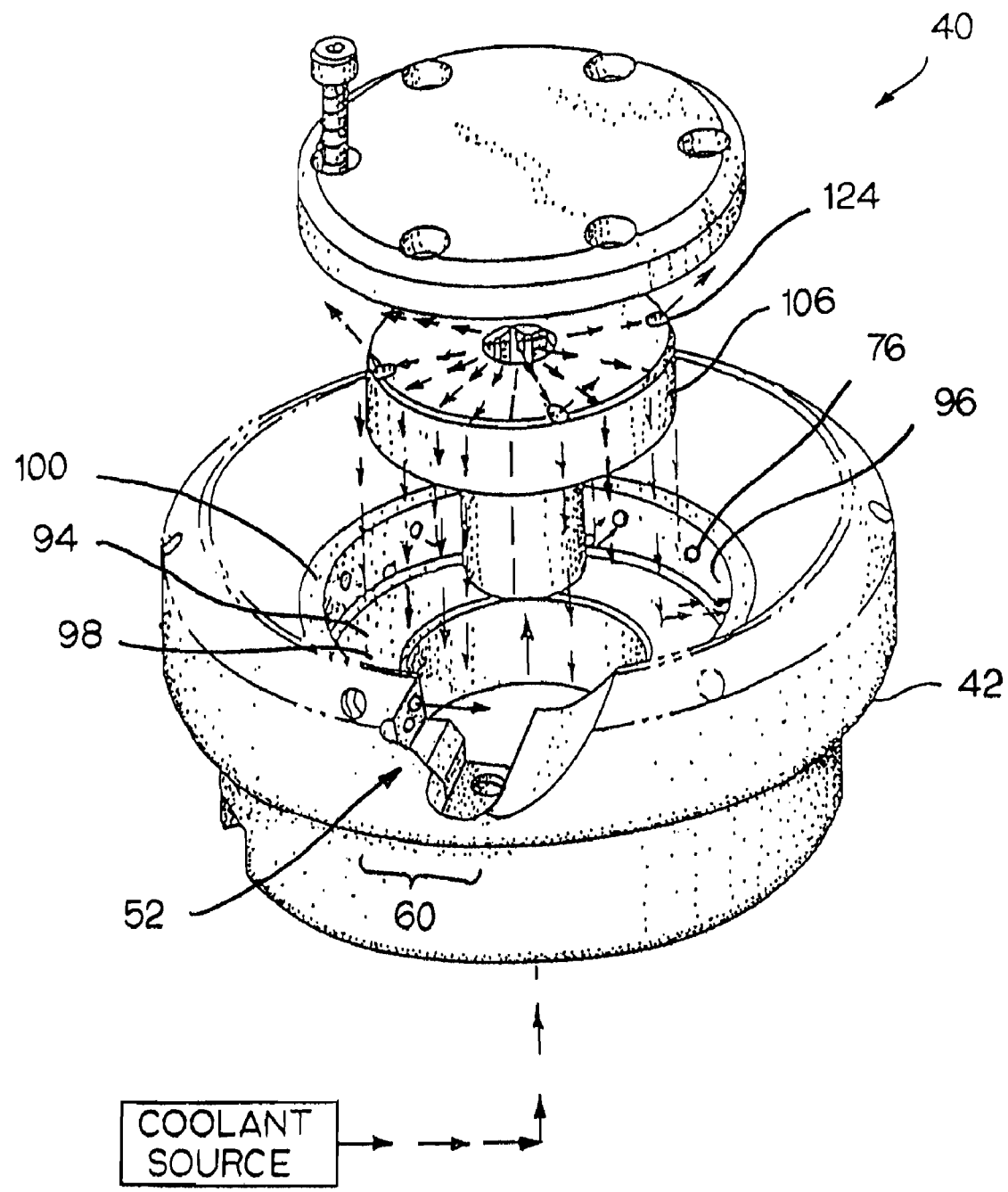
FIG. 3 is an isometric view of the milling cutter assembly of FIG. 1 showing the milling cutter body with the reservoir cap and the retention knob exploded away from the milling insert body to expose the central coolant reservoir, and wherein the flow of coolant is illustrated by arrows.

As illustrated in FIG. 3, the milling cutter body 42 further includes a central coolant (or fluid) reservoir 94 that is in communication with a coolant source designated in FIG. 3 as COOLANT SOURCE. The central coolant reservoir 94 is defined (at least in part) by a central upstanding wall 96 which has an upward (or has a generally vertical orientation as viewed in FIG. 3). The upstanding wall 96 extends upwardly from the bottom surface 98 of the milling cutter body 42 wherein the bottom surface 98 also defines (in part) the central coolant reservoir 94. The central upstanding wall 96 has a top edge 100 as viewed in FIG. 3.

The central upstanding wall 96 contains a coolant passage 76 that provide fluid communication between the coolant reservoir 94 and the pocket 52. Each coolant passage 76 corresponds to a pocket 52 in that coolant is supplied to the corresponding pocket 52 through the corresponding coolant passage 76. Although applicants do not intend to be restricted to coolant passages 76 of any specific size or internal geometry, applicants contemplate that the dimension and geometry of each coolant passage 76 are such to provide for adequate flow of coolant to the corresponding pocket, and hence, to the corresponding milling insert retained in the pocket. Further, applicants contemplate that as opposed to being a single coolant passage, there may be a plurality (e.g., a pair) of coolant passages that supply coolant to each pocket from the central coolant reservoir.

Figure 4:
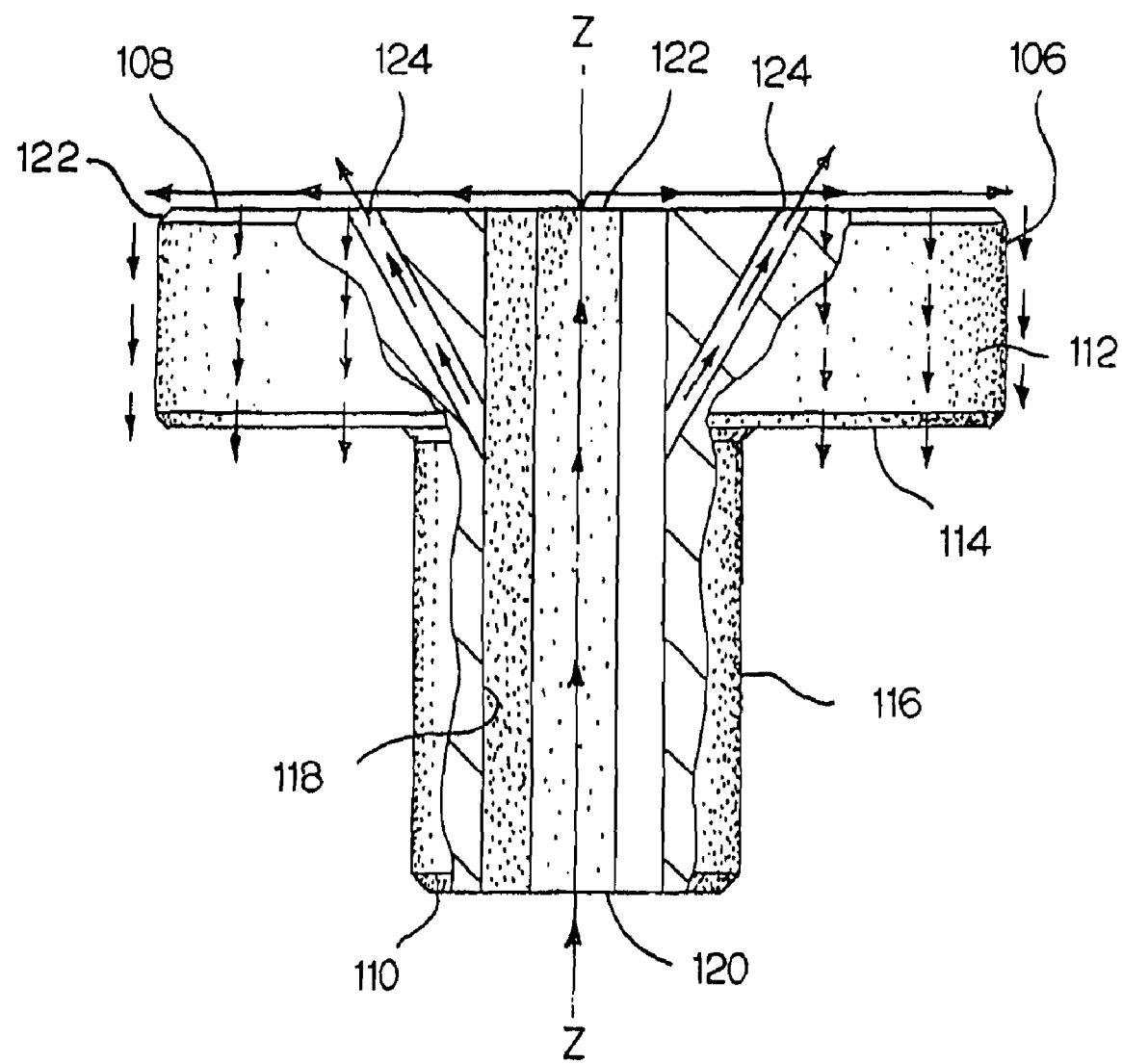
FIG. 4 is a side view of the lock screw of FIG. 3 with a portion thereof cut away to show the central bore and auxiliary inclined bores thereof, and wherein the flow of coolant is shown by arrows.

As shown in FIGS. 3 and 4, the milling cutter assembly 40 further contains a lock screw generally designated as 106. Lock screw 106 has a top end 108 and a bottom end 110 as viewed in FIG. 4. Lock screw 106 has an enlarged diameter section 112, which defines a shoulder 114, adjacent to the top end 108 thereof. An elongate integral cylindrical shank 116 projects from the enlarged diameter section 112. The lock screw 106 contains a central longitudinal hexagonal bore 118 therein that travels through the length thereof.

The lock screw 106 further contains a plurality of radial inclined bores 124 disposed at an angle to the longitudinal axis Z-Z of the lock screw 106. Each one of the inclined bores 124 provides fluid communication between central bore 118 and the top circular corner 122 of the lock screw 106. These inclined bores 124 provide additional passages through which coolant can travel from the coolant source to the coolant reservoir. As shown in FIGS. 3 and 4 by the arrows, coolant enters the hexagonal bore 118 at the bottom end 120 thereof and flows through bore 118 so that the coolant exits the hexagonal bore 118 at the top end 122 thereof. The coolant also exits the central bore 118 via the inclined bores 124 as shown by the arrows. The coolant that exits the lock screw 106 (whether via the central bore 118 or the inclined bores 124) then flows to enter the central coolant reservoir 94 as illustrated by the arrows.

Figure 5:
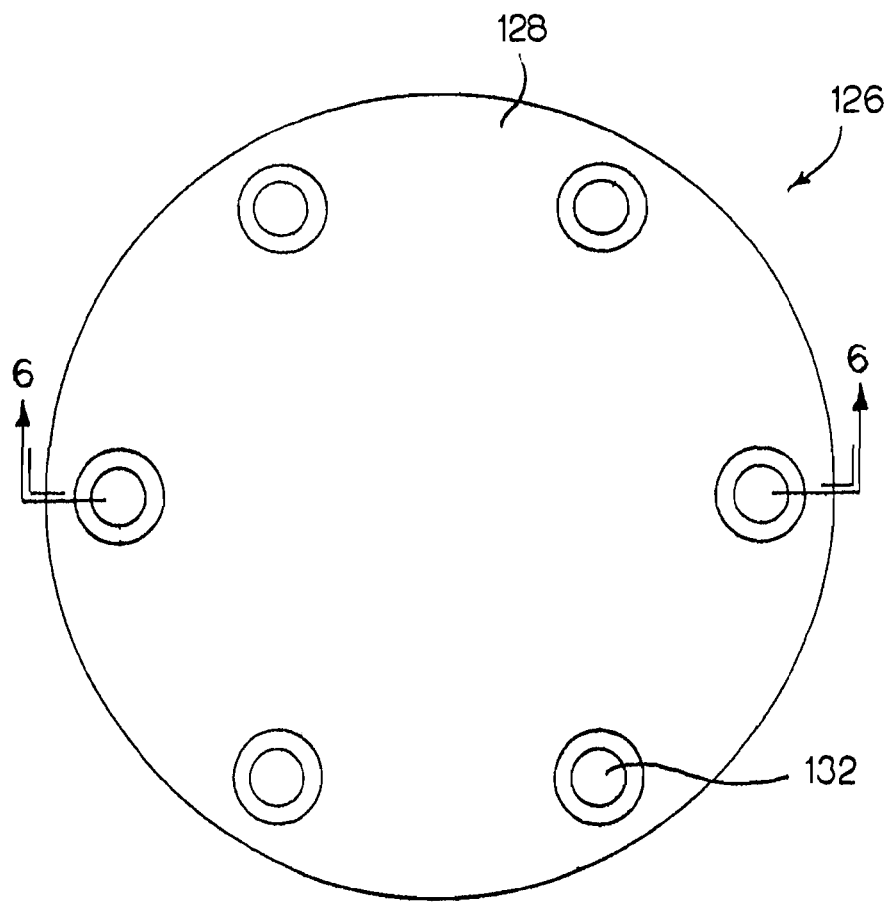
FIG. 5 is a top view of the reservoir cap of FIG. 3.
Figure 6:
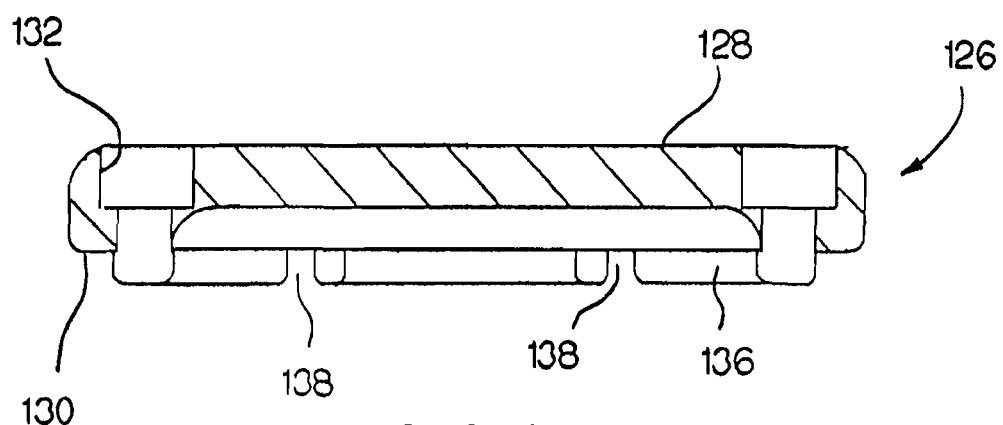
FIG. 6 is a cross-sectional view of the reservoir cap taken along section line 5-5 of FIG. 5.
Figure 7:
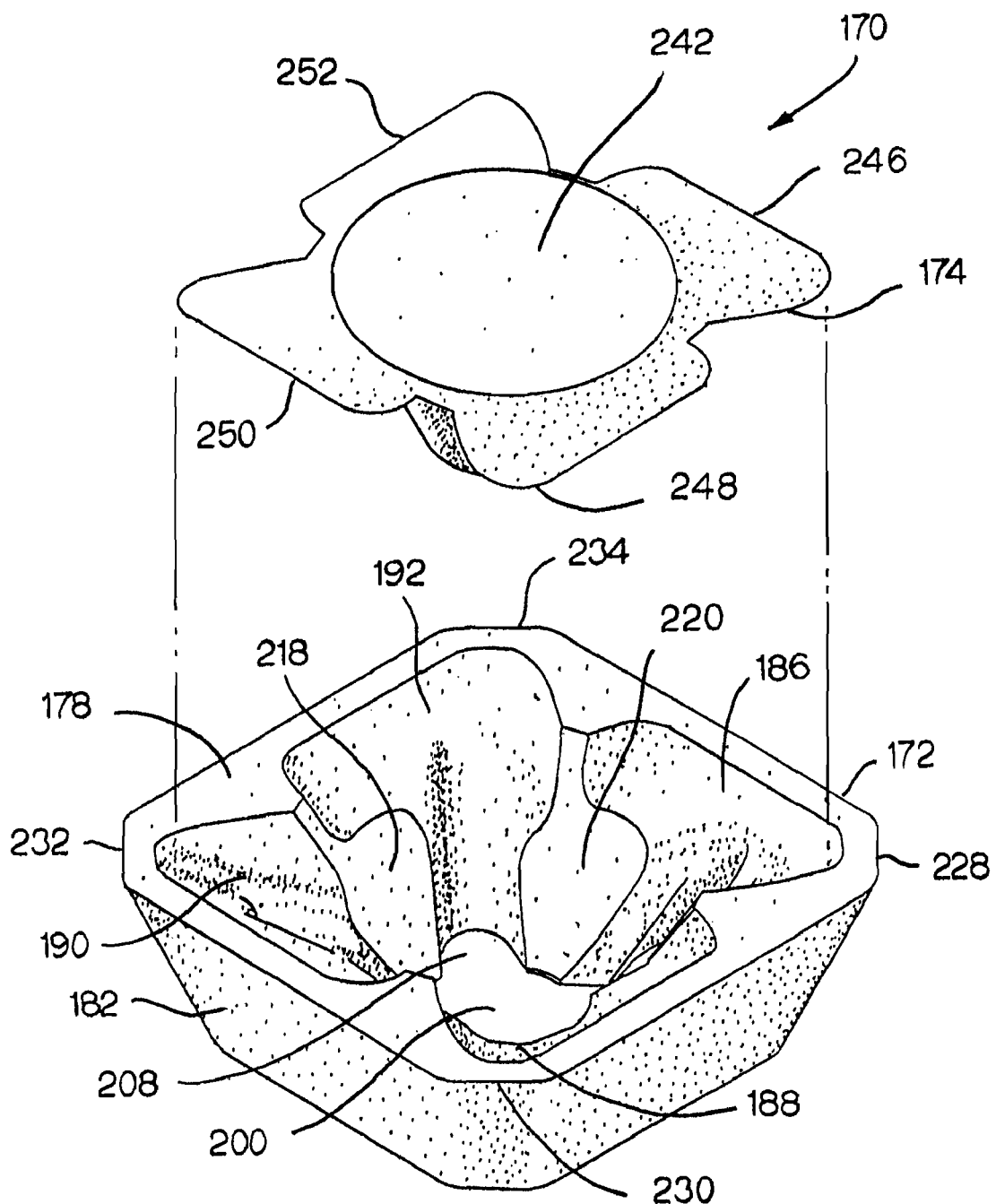
FIG. 7 is an isometric view of the milling insert with the plate exploded away from the milling insert body.
Figures 8, 9:
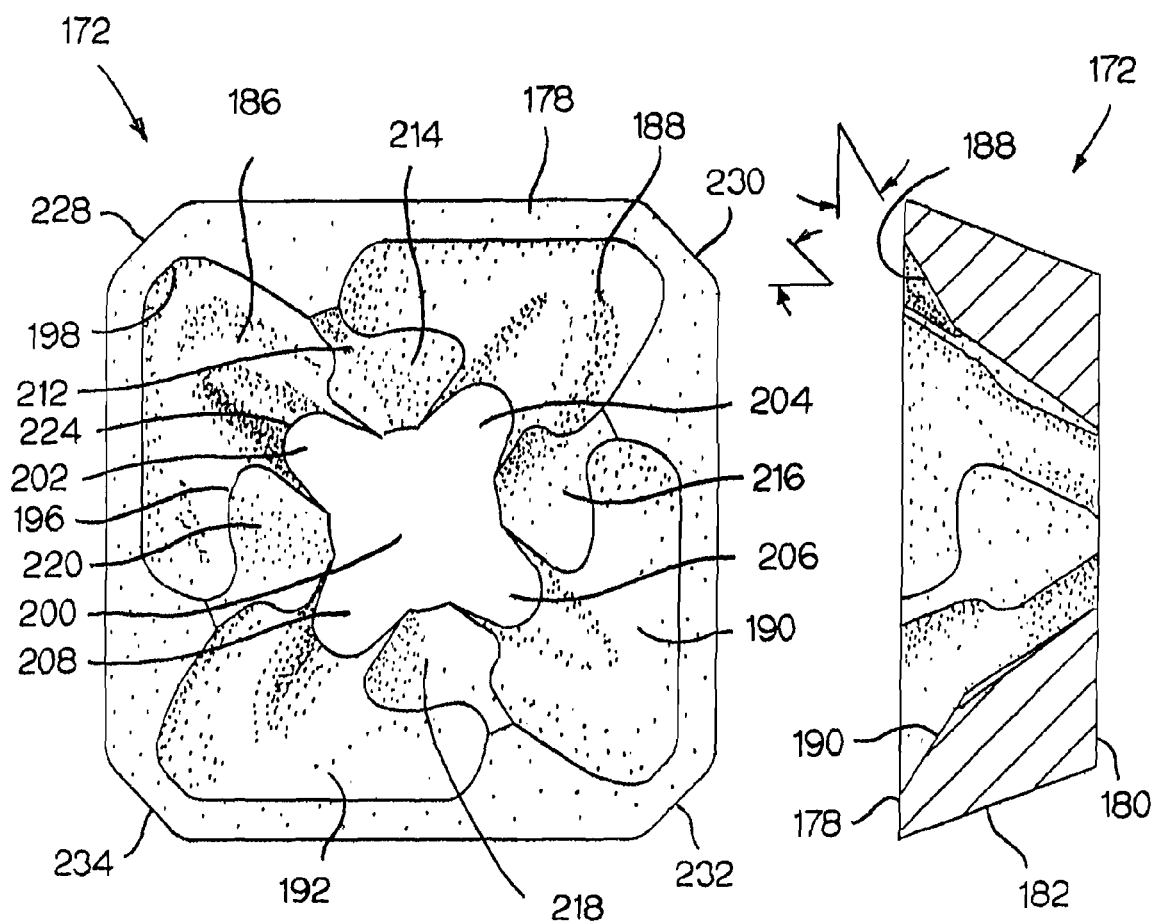
FIG. 8 is a plan view showing the rake surface of the milling insert body that contains the discrete depressions therein.
FIG. 9 is a cross-sectional view of the milling insert body of FIG. 8 taken along section line 9-9.
Figure 10:
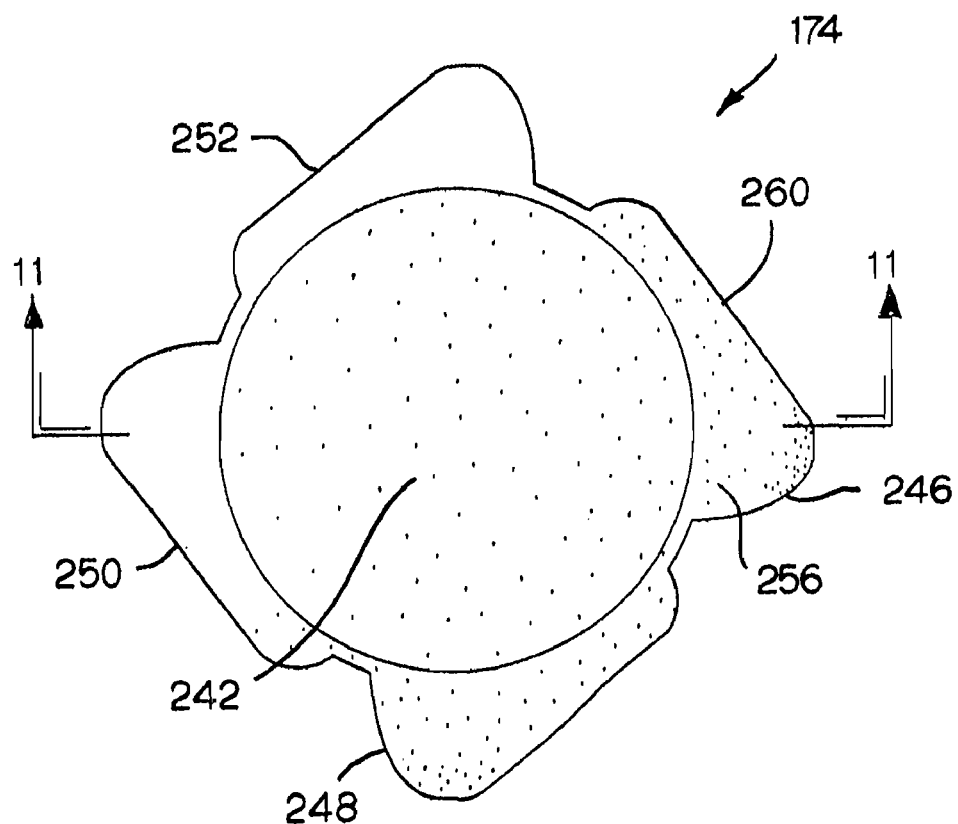
FIG. 10 is a plan view showing the top surface of the plate.

As illustrated in FIGS. 5 and 6, the milling cutter assembly 40 also includes a reservoir cap generally designated as 126, which defines in part the central coolant reservoir 94. Reservoir cap 126 has a top surface 128 and a bottom surface 130. The reservoir cap 126 contains a plurality of bolt holes 132, which are located in an equi-spaced fashion at the periphery of the reservoir cap 126. Each one of the bolt holes 132 is adapted to receive a bolt 134 (see FIG. 3) to affix the reservoir cap 126 to the milling cutter body 42. The reservoir cap 126 further includes a depending generally circular integral flange 136 that contains a plurality of notches 138 wherein the notches 138 are equi-spaced about the circumference of the flange 136.

Referring to FIG. 1, the milling cutter assembly 40 further includes a plurality of milling insert (or cutting insert) assemblies wherein each one of the milling inserts is generally designated as 150. As is apparent from FIG. 1, each one of the pockets 52, and in particular the seating sections 60, receive and retain a milling insert assembly 150. The milling insert assembly 150 contains a number of components; namely, the milling insert (which can be more broadly considered as a cutting insert), the shim, the clamp and threaded members, which are described in more detail hereinafter. It should be appreciated that applicants contemplate that the term "cutting insert" is inclusive (without limitation) of milling inserts and turning inserts, as well as other styles and kinds of inserts used to engage the workpiece and remove material in a material removal operation such as, for example, a chipforming and material removal operation.

Figure 15:
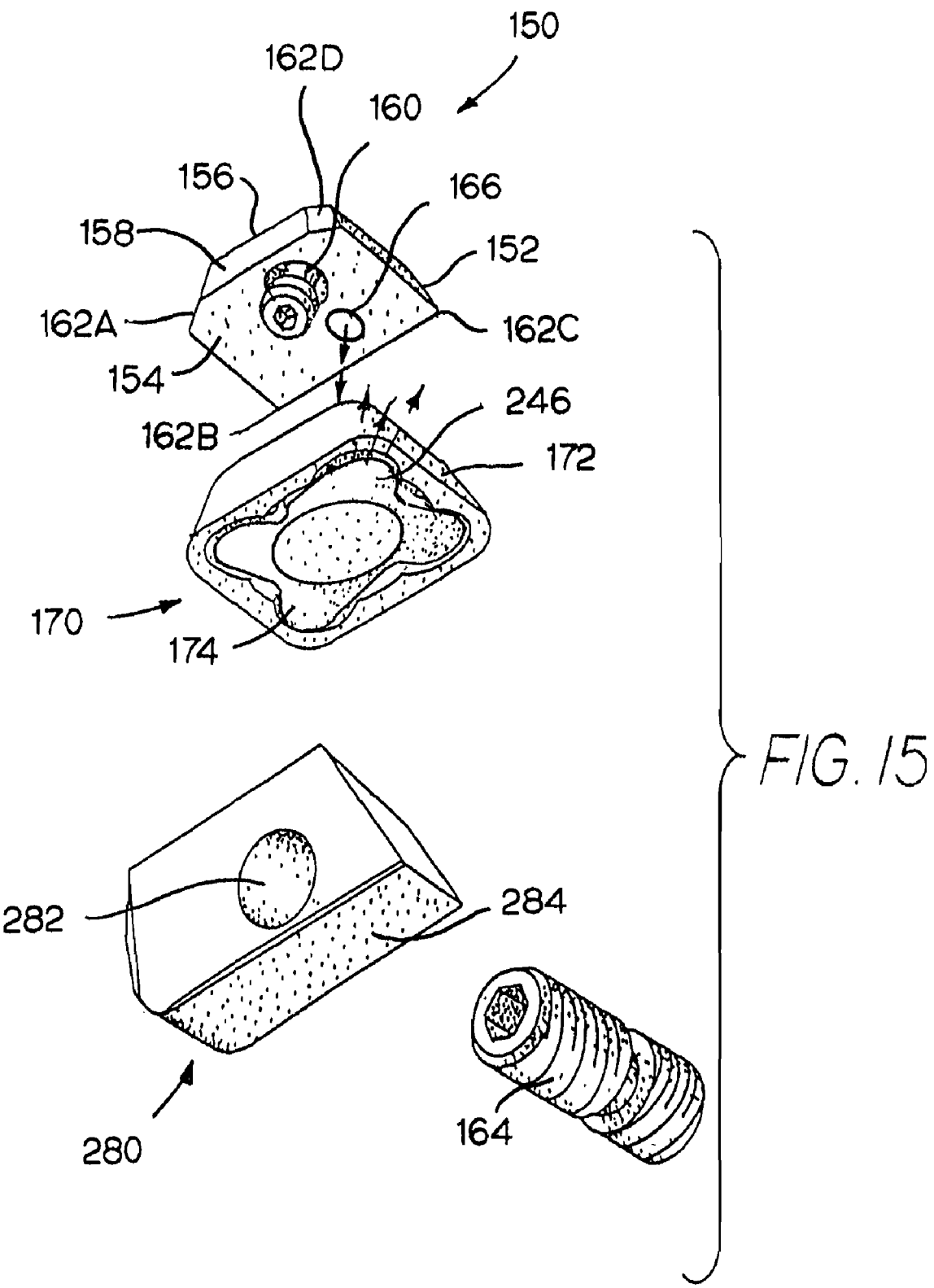
FIG. 15 is an isometric view of the specific embodiment of the milling insert assembly of FIG. 1 wherein the clamp, the milling insert body, the plate and the shim are exploded apart from one another.

As mentioned above, the milling insert assembly 150 includes a shim generally designated as 152. One specific embodiment of the shim 152 is illustrated in FIG. 15. Shim 152 presents a top surface 154, a bottom surface 156 and a peripheral flank (or edge) surface 158. Shim 152 contains a pair of bores therein. One of these bores is a fastener bore 160 that receives a threaded member 164 that affixes the shim 152 and the milling insert to the milling cutter body 42 in a fashion known to those of ordinary skill in the relevant art. Shim 152 also presents four corners (162A, 162B, 162C, 162D) wherein corners 162B and 162C are sharp corners and corners 162A and 162D are flat corners defined by a flat surface.

Figure 18:
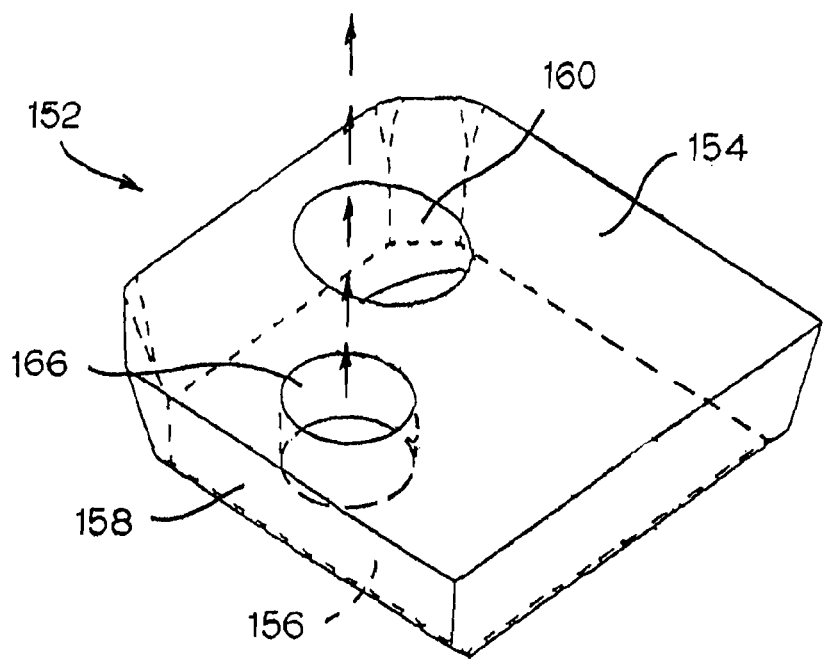
FIG. 18 is an isometric view of a specific embodiment of a shim used in conjunction with the milling insert of FIG. 7.

The other bore 166 is a coolant bore in alignment with the pocket opening 77 when the milling insert assembly 150 is affixed in the pocket 52. As one can appreciate from FIG. 18, the coolant bore 166 is offset from the geometric center of the top surface 154 of the shim 152. The nature of the offset of coolant bore 166 is like that for opening 77 so that the coolant bore can register or align with a selected lobe of the central coolant passage of the milling insert depending upon the position of the milling insert in the pocket. As shown by the arrows in FIGS. 15 and 18, coolant flows from the coolant bore 166 bore 168 into the milling insert as will be described hereinafter.

Referring to FIGS. 7 through 15, the milling insert assembly 150 includes a milling insert generally designated as 170. Milling insert 170 has a milling insert body 172 and a corresponding plate 174 wherein the plate 174 attaches to the milling insert body 172 to form the milling insert 170.

The diverter plate 174 can be attached or affixed to the milling insert body 172 in any one of a number of different ways. In this regard, these components (i.e., the milling insert body and the diverter plate) can be affixed together by adhesive or braze or the like. The milling insert body and the diverter plate may be sintered together to form a single milling insert. As still another alternative, the structure defined by the combination of the milling insert body and diverter plate can be formed as a monolithic body via a powder metallurgical technique that is suitable to make a body with an internal channel. In this regard, the following patent documents are exemplary of powder metallurgical methods to make a body with internal passages: U.S. Pat. No. 4,881,431 to Bieneck for a Method of Making a Sintered Body having an Internal Channel, and U.S. Pat. No. 6,860,172 to Hecht for a Method for Making a Powdered Metal Compact.

The milling insert (including the milling insert body and the diverter plate) may be made from one of any number of materials that are suitable for use as a cutting insert. The following materials are exemplary materials useful for a cutting insert: tool steels, cemented carbides, cermets or ceramics. The specific materials and combinations of materials depend upon the specific application for the milling insert. Applicants contemplate that the milling insert body and the diverter plate may be made from different materials.

In reference to tool steels, the following patent documents disclose tool steels suitable for use as a cutting insert: U.S. Pat. No. 4,276,085 for High speed Steel, U.S. Pat. No. 4,880,461 for Superhard high-speed tool steel, and U.S. Pat. No. 5,252,119 for High Speed Tool Steel Produced by Sintered Powder and Method of Producing the Same. In reference to cemented carbides, the following patent documents disclose cemented carbides suitable for use as a cutting insert: U.S. Patent Application Publication No. US2006/0171837 A1 for a Cemented Carbide Body Containing Zirconium and Niobium and Method of Making the Same, U.S. Reissue Patent No. 34,180 for Preferentially Binder Enriched Cemented Carbide Bodies and Method of Manufacture, and U.S. Pat. No. 5,955,186 for a Coated Cutting Insert with A C Porosity Substrate Having Non-Stratified Surface Binder Enrichment. In reference to cermets, the following patent documents disclose cermets suitable for use as a cutting insert: U.S. Pat. No. 6,124,040 for Composite and Process for the Production Thereof, and U.S. Pat. No. 6,010,283 for a Cutting Insert of a Cermet Having a Co-Ni-Fe Binder. In reference to ceramics, the following patent documents disclose ceramics suitable for use as a cutting insert: U.S. Pat. No. 5,024,976 for an Alumina-zirconia-silicon carbide-magnesia Ceramic Cutting Tools, U.S. Pat. No. 4,880,755 for a Sialon Cutting Tool Composition, U.S. Pat. No. 5,525,134 for a silicon Nitride Ceramic and Cutting Tool made Thereof, U.S. Pat. No. 6,905,992 for a Ceramic Body Reinforced with Coarse Silicon Carbide Whiskers and Method for Making the Same, and U.S. Pat. No. 7,094,717 for a SiAlON Containing Ytterbium and Method of Making.

Milling insert body 172 has a peripheral rake surface 178 that extends about the periphery of the milling insert body 172, an opposite bottom surface 180, and a peripheral flank surface 182. The peripheral rake surface 178 surrounds a plurality of discrete (generally concave) depressions (186, 188, 190, 192) contained in the milling insert body 172. Because each one of the discrete depressions is essentially alike, a description of discrete depression 186 will suffice for the description of the other discrete depressions (188, 190, 192). In this regard, discrete depression 186 has a radial inward boundary 196 and a radial outward boundary 198.

Milling insert body 172 further contains a central coolant passageway 200 in the bottom surface 180 thereof. Coolant passageway 200 has four equi-spaced apart radial lobes (202, 204, 206, 208) wherein each lobe extends in a radial outward direction toward its corresponding cutting edge (or cutting location) as described hereinafter. Milling insert body 172 still further contains a central generally concave indention 212 that surrounds the central coolant passageway 200. Central indention 212 defines four sealing surfaces (214, 216, 218, 220), which have an arcuate (or concave) surface, between adjacent discrete depressions. These sealing surfaces extend from the central coolant passage 200 to the peripheral rake surface 178. More specifically, sealing surface 214 is between discrete depression 186 and discrete depression 188, sealing surface 216 is between discrete depression 188 and discrete depression 190, sealing surface 218 is between discrete depression 190 and discrete depression 192, and sealing surface 220 is between discrete depression 192 and discrete depression 186.

The sealing surfaces (214, 216, 218, 220) are locations where the milling insert body and the diverter plate join. As will be described hereinafter, in the case of a two-piece (i.e., the milling insert body and the diverter plate) milling insert, these seals in the vicinity of the sealing surfaces may be formed via secure surface-to-surface contact in the case of a strong force (e.g., a clamping force) exerted against the milling insert to urge the diverter plate against the milling insert body. In the case where a single piece milling insert is formed by joining together the milling insert body and the diverter plate, the seal in the vicinity of the sealing surfaces could be formed due to the joinder, such as, for example, by sintering or brazing, of the components together along the adjacent surface areas. The same is true in the case of where the components are joined along adjacent surface areas by adhesive or the like. In the case where the milling insert is a monolithic body, the discrete internal channels (which could have a geometry like that of the interior channels formed via the assembly of the milling insert body and the diverter plate) would be formed by as internal channels in the interior of the part during formation wherein the volume of material in the vicinity of the sealing surfaces would function as barriers to define the discrete internal channels.

A specific lobe of the central coolant passageway 200 intersects each one of the discrete depressions. In this regard, lobe 202 intersects discrete depression 186, lobe 204 intersects discrete depression 188, lobe 206 intersects discrete depression 190, and lobe 208 intersects discrete depression 192. In reference to discrete depression 186, which has application to the other discrete depressions, there is a boundary 224 at the intersection between the discrete depression 186 and the lobe 202 of the central coolant passageway 200.

Milling insert body 172 presents four cutting edges (228, 230, 232, 234) at the juncture between the peripheral flank surface 182 and the peripheral rake surface 178. When in operation, the milling insert has an orientation such that one of the cutting edge (i.e., a selected one of the cutting edges) engages the workpiece so as to perform a chipforming and material removal operation. The vicinity where the cutting edge engages the workpiece can be considered to be the cutting location.

Figure 11:
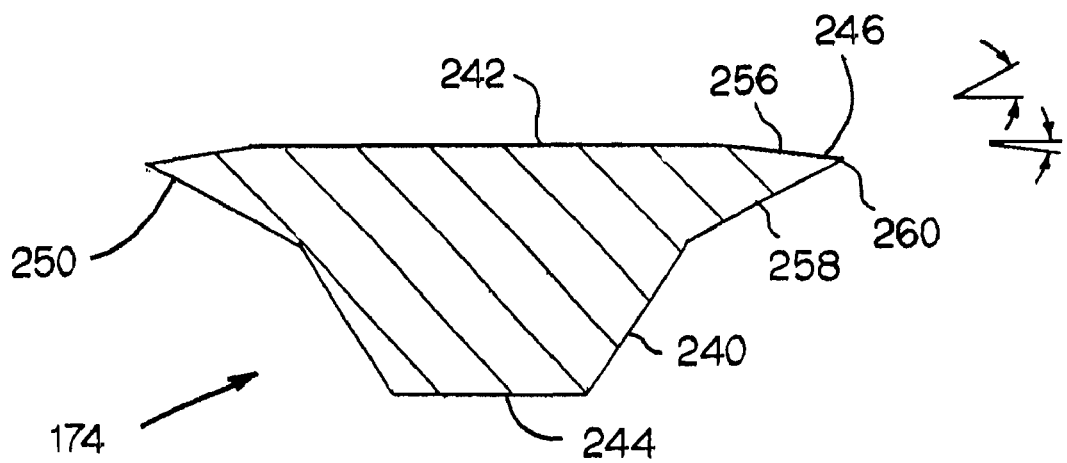
FIG. 11 is a cross-sectional view of the plate of FIG. 10 taken along section line 11-11.
Figure 12:
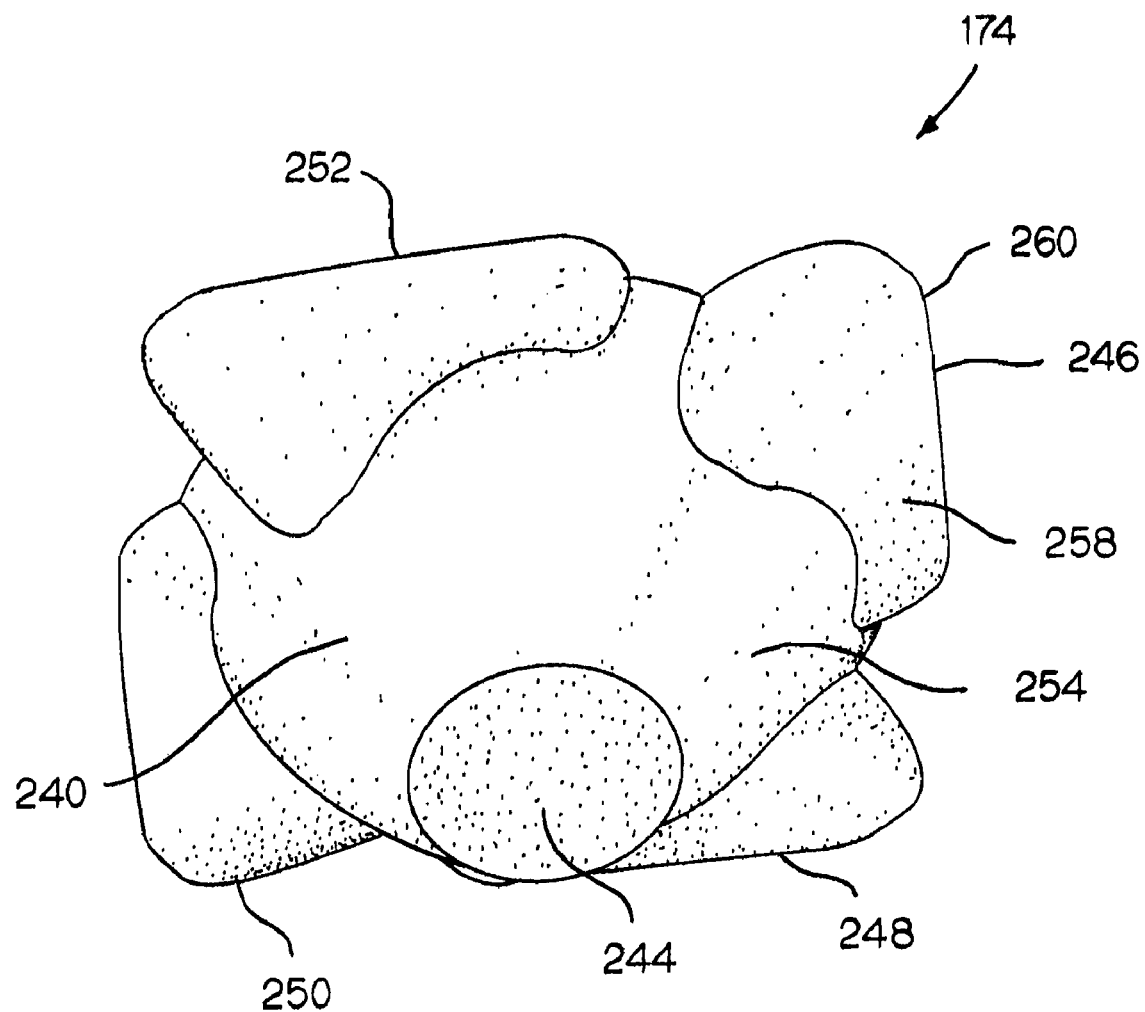
FIG. 12 is an isometric view of the plate showing the bottom surface of the plate.

As mentioned above, milling insert 170 further includes a diverter plate 174. Diverter plate 174 has a central body 240 that presents a generally frusto-conical shape. Central body 240 further has a top face 242 and a bottom face 244. Four tapered flanges (246, 248, 250, 252) extend in a radial outward direction from near the bottom face 244 of the diverter plate 174. Since each one of the tapered flanges (246, 248, 250, 252) is alike, a description of tapered flange 246 will suffice for a description of the other tapered flanges. Tapered flange 246 has an inclined top surface 256 disposed at an included angle "C" with respect to the top surface 242 as shown in FIG. 11. Tapered flange 246 has an inclined bottom surface 258 disposed at an included angle "D" with respect to the top surface 242 as shown in FIG. 11. Inclined top surface 256 and inclined bottom surface 258 intersect to define a peripheral edge 260.

In this specific embodiment, the complete milling insert 170 is formed by the assembling together of the milling insert body 172 and the diverter plate 174. As mentioned above, the milling insert body 172 and the diverter plate 174 can be affixed together by any one of a number of techniques. In addition, it should be appreciated that the milling insert body may be made from one material and the diverter plate made from another material. In other words, the milling insert body and the diverter plate can be made from different materials. By making the milling insert body and diverter plate from different materials, in certain instances an advantage can be gained over an assembly (i.e., milling insert body and diverter plate) made from the same materials.

To assembly together these components, the central body 240 of the diverter plate 174 is positioned within the cavity in the rake surface of the milling insert body, and the diverter plate 174 is firmly pushed against the milling insert body 172 so that there is close contact between the two components. Such close surface-to-surface contact is shown in FIG. 14 wherein the sealing surface 214 and its proximate surface area of the central body 240 (which is designated as region 254 in FIGS. 12 and 14) are in intimate contact.

When there is intimate close contact between the selected surface areas of the diverter plate 174 and the milling insert body 172, a seal is formed between each one of the sealing surfaces (214, 216, 218, 220) and the proximate surface area of the central body portion 240 of the diverter plate 174. These seals help define each one of a plurality of discrete internal channels that are essentially in fluid isolation from one another. Each discrete internal channel is defined between the discrete depression, the corresponding tapered flange (of the diverter plate) and the proximate surface area of the central body portion of the diverter plate.

It should be appreciated that in the case of a two-piece (i.e., the milling insert body and the diverter plate) milling insert, these seals may be formed via secure surface-to-surface contact in the case of a strong force (e.g., a clamping force) exerted against the milling insert to urge the diverter plate against the milling insert body. In the case where a single piece milling insert is formed by joining together the milling insert body and the diverter plate, the seal could be formed due to the joinder, such as, for example, by sintering or brazing, of the components together along the adjacent surface areas. The same is true in the case of where the components are joined along adjacent surface areas by adhesive or the like. Finally, in the case where the milling insert is a monolithic body, the discrete internal channels (which could have a geometry like that of the interior channels formed via the assembly of the milling insert body and the diverter plate) would be formed by as internal channels in the interior of the part during formation.

Figure 13:
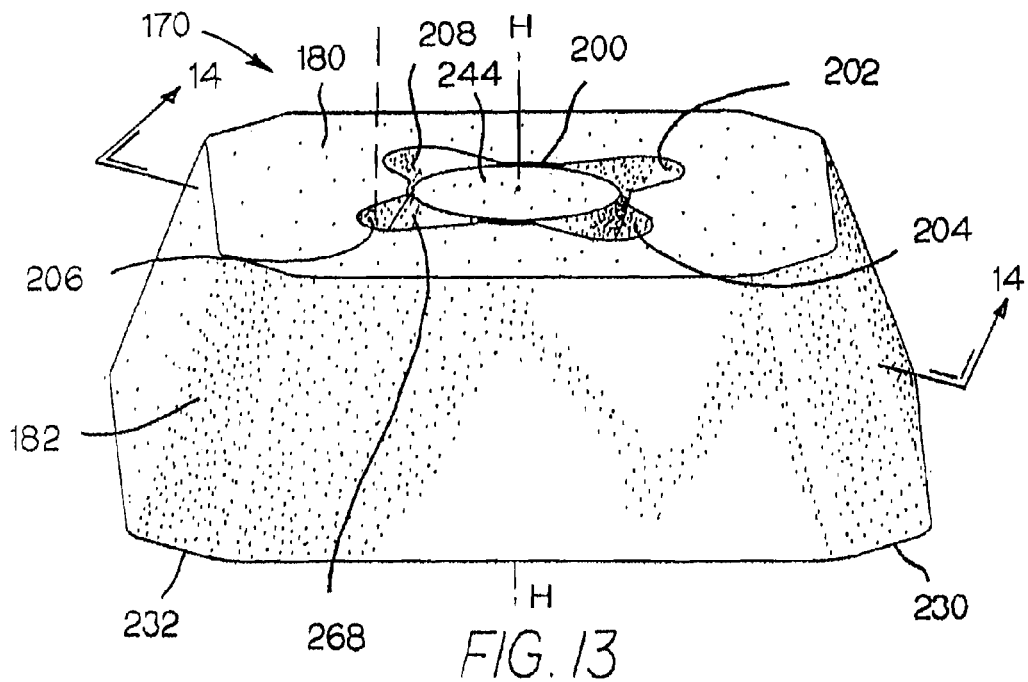
FIG. 13 is an isometric view of the milling insert assembly of FIG. 1 showing the bottom surface of the milling insert.
Figure 14:
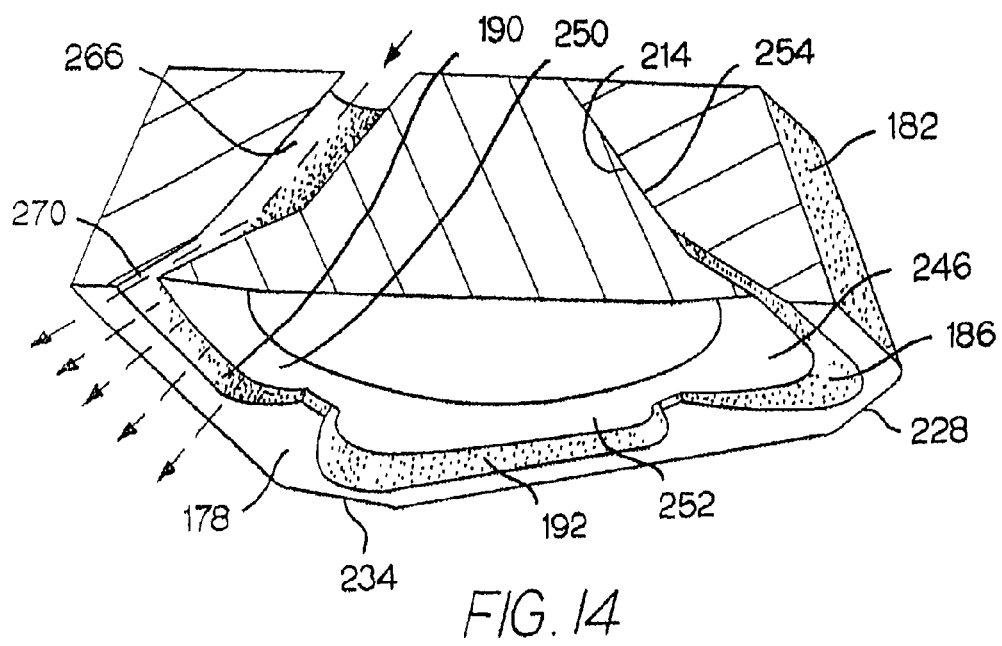
FIG. 14 is a cross-sectional view of the milling insert of FIG. 14 taken along section line 14-14 of FIG. 14.

In this specific embodiment, there are four discrete internal channels wherein FIG. 14 shows a representative one of these internal channels designated as 266. Since the internal channels present essentially the same geometry, the following description of internal channel 266 will suffice for a description of the other internal channels. Discrete internal channel 266 has an inlet 268 (see FIG. 13) that opens adjacent to the bottom surface 180 (of the milling insert body 172) and the bottom face 244 of the diverter plate 174. Inlet 268 is offset in the radial outward direction from the central axis H-H of the milling insert 170. As can be seen in FIG. 13, each one of the inlets of the other internal channels is offset from the central axis H-H.

Internal channel 266 has an outlet 270 for the exit of coolant as shown by the arrows in FIG. 14. Each one of the outlets 270 opens adjacent to the peripheral rake surface 178 and the corresponding tapered flange that extends from the diverter plate. Each internal channel corresponds to a cutting edge so that when the internal channel is in fluid communication with the coolant source, the internal channel will provide for the flow of coolant toward the corresponding cutting edge. As shown in FIG. 14 the coolant exits the internal channel in the form of a fan-shaped spray (see arrows in FIG. 14).

Milling insert assembly 150 further contains a clamp 280 that contains an aperture 282 and a peripheral surface 284. The aperture 282 is designed to receive a threaded member to affix the clamp 280 to the clamp seating surface 84 wherein the threaded member passes through the aperture and engages the threaded hole 90 in the clamp seating surface 84.

The milling insert assembly 150 is affixed in the pocket 52 of the milling cutter assembly 40 in such a fashion that the shim 152 is secured to the seating surface 62 via a threaded member that passes through fastener bore 160 and engages threads in the threaded bore 68. The bottom surface 156 of the shim 152 presses firmly against the seating surface 62. Shim 152 has an orientation such that the coolant bore 166 is in alignment with the opening 77 (and coolant passage 76).

Milling insert 170 is positioned within the pocket 52 so that the bottom surface 180 thereof is securely against the top surface 154 of the shim 152. The milling insert 170 has an orientation so that a selected one of the lobes (202, 204, 206, 208) of the central coolant passage 200 is in alignment with the coolant bore 166 in the shim 152. The milling insert 170 is in fluid communication with the coolant source via the coolant passage 76 and the central coolant reservoir 94 whereby coolant may flow into the milling insert 170. Then, coolant flows through the milling insert 170 via the discrete internal channel that corresponds to the lobe aligned with the coolant passage 166.

When in the orientation illustrated by FIGS. 13 through 15, coolant from the coolant source passes through the milling cutter body 42 in that it flows via the passages (118, 124) in the lock screw 106 into the central coolant reservoir 94. Coolant passes out of the coolant reservoir 94 via the coolant passages 76 and through the coolant bore 166 through the inlet 268 into the discrete internal channel 266 that corresponds to lobe 206, which is the lobe aligned with the coolant passage 166. Coolant travels through the discrete internal channel 266, and then exits the internal channel 266 at the outlet 270 thereof Coolant exits along the length defined by a portion of the peripheral edge of the corresponding flange 250 of the diverter plate 174 (see the arrows adjacent to flange 250 in FIG. 14). The coolant exits in such a fashion so as to comprise a direct spray on the corresponding cutting edge 232, and thus, there is provided a flow of coolant directly to the vicinity of the engagement of the cutting edge with the workpiece.

As can be appreciated, there will come a point during the milling operation that the milling insert 170 will need to be indexed or repositioned to present a new cutting edge for engagement with the workpiece. In the case of the indexable milling insert, this means that the milling insert 170 will be rotated in the pocket 52 to present a new cutting edge. By rotating the milling insert 170 in the pocket 52, the coolant bore 166 in the shim 152 will be in alignment with a different discrete internal channel wherein this internal channel corresponds to the new cutting edge. When in operation, coolant will be supplied in the vicinity where the new cutting edge engages the workpiece.

The fact that the coolant bore 166 of the shim 152 and the lobes of the milling insert 170 are offset from the geometric centers of the shim and the bottom surface 180 of the milling insert 170, respectively, provides for the feature that a different discrete internal channel (which corresponds to the new cutting edge) receives coolant to supply to the new cutting edge in engagement with the workpiece.

Figure 16A:
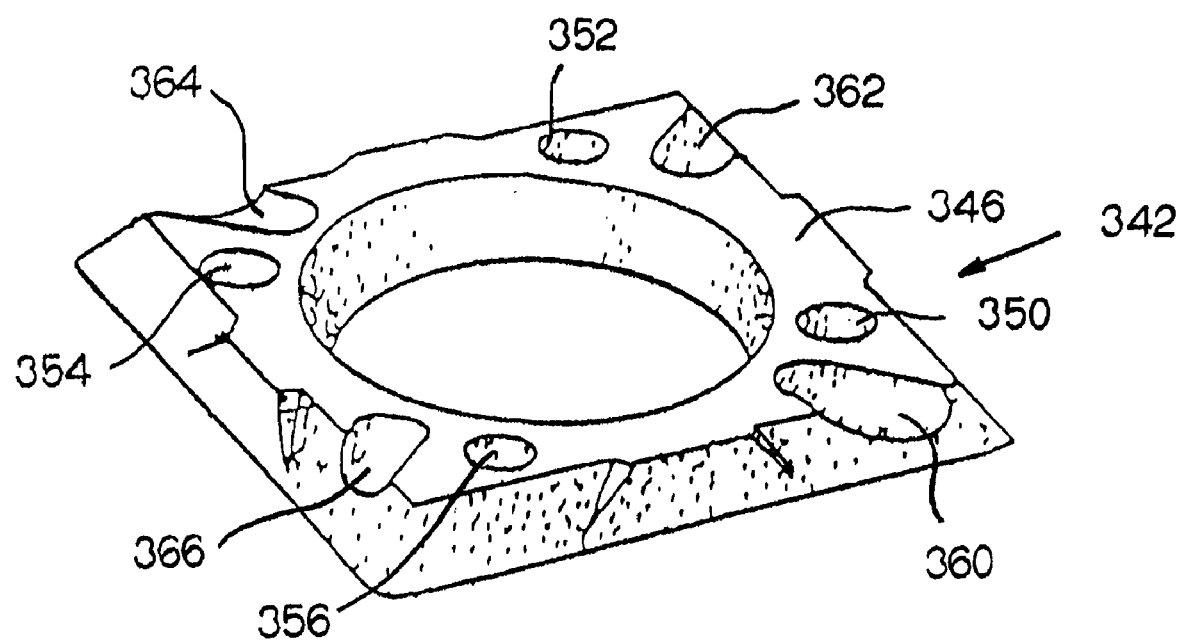
FIG. 16A is an isometric view of the top rake plate of FIG. 16.
Figure 17:
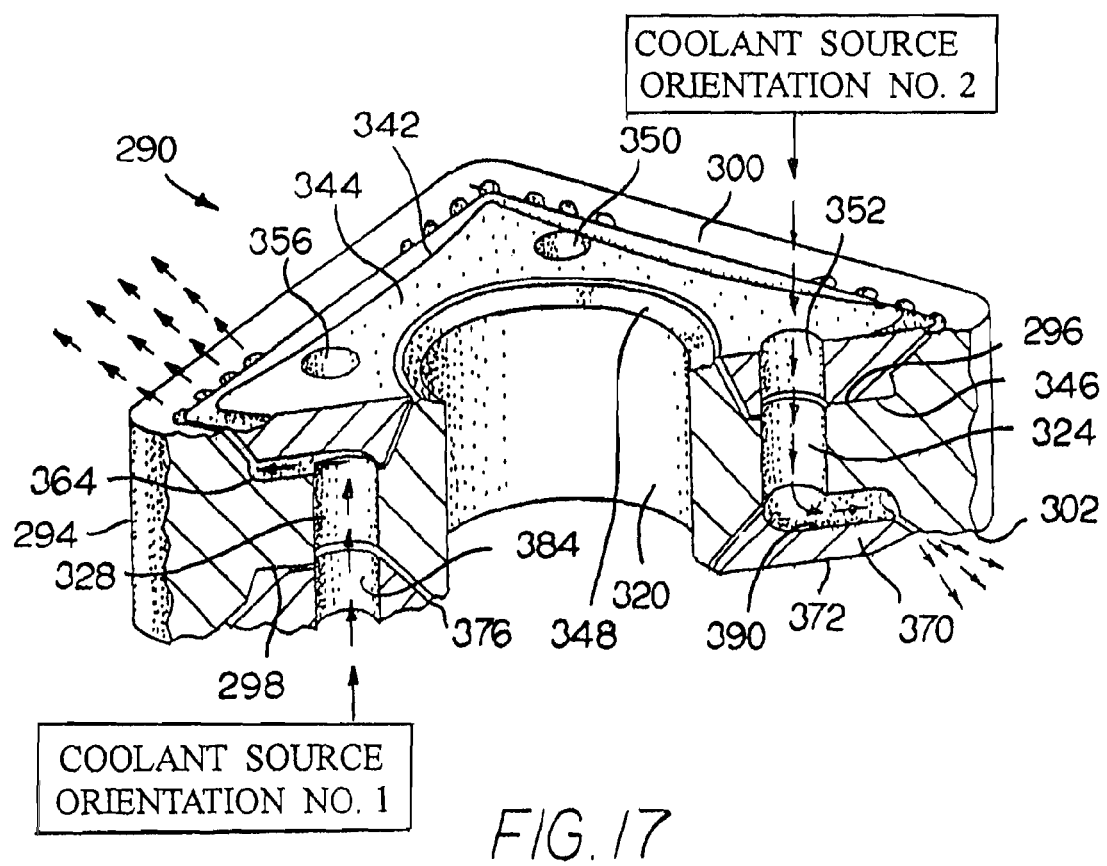
FIG. 17 is a cross-sectional view of the milling insert assembly of FIG. 14, when in an assembled condition.

Referring to FIGS. 16 and 17, there is shown another specific embodiment of a milling insert 290 that is illustrated as a multi-component structure in that there is a mediate milling insert body and a pair of opposite rake plates that can be affixed to the mediate milling insert body. The opposite rake plates can be attached or affixed to the mediate milling insert body in any one of a number of different ways. In this regard, these components can be affixed together by adhesive or braze or the like. The milling insert body and the diverter plate may be sintered together to form a single milling insert. As still another alternative, the structure defined by the combination of the milling insert body and rakes plates can be formed as a monolithic body via a powder metallurgical technique that is suitable to make a body with an internal channel. The above-referred patent documents that are exemplary of powder metallurgical methods to make a body with internal passages are applicable to this milling insert.

It should be appreciated that the mediate milling insert body may be made from one material and one or both of the rake plates made from another material. In other words, the milling insert body and either one or both rake plates can be made from different materials including each rake plate made from a different material. By making the milling insert body and the rake plates (one or both) from different materials, in certain instances an advantage can be gained over an assembly (i.e., milling insert body and one or both rake plates) made from the same materials.

Milling insert 290 defines eight cutting edges that comprise four cutting edges adjacent to one rake surface of the milling insert and four cutting edges adjacent to the other rake surface of the milling insert 290. Milling insert 290 also contains discrete internal channels wherein each internal channel is essentially in fluid isolation from the other internal channel. These internal channels comprise a first set of four discrete internal channels wherein each one of these channels of the first set corresponds with one of the cutting edges adjacent to the one rake surface. These internal channels comprise a second set of four discrete internal channels wherein each one of these channels of the second set corresponds with one of the cutting edges adjacent to the other rake surface.

Milling insert 290 includes a mediate milling insert body 292. The milling insert body 292 has a peripheral flank surface 294, as well as opposite faces 296 and 298. The mediate milling insert body 292 further presents a peripheral portion of the rake surface 300 on one face 296 and another peripheral portion of the rake surface 302 on the other face 298. The intersection between the peripheral flank surface 294 and the peripheral portion of the rake surface 300 define cutting edges 304, 306, 308 and 310 wherein these cutting edges are adjacent to one rake surface of the milling insert. The intersection between the peripheral flank surface 294 and the peripheral portion of the rake surface 302 define cutting edges 312, 314, 316 and 318 wherein these cutting edges are adjacent to another rake surface of the milling insert.

Milling insert body 292 further contains a central aperture 320 that passes completely through the milling insert body. Milling insert boy 292 further contains a plurality of peripheral apertures that pass completely through the milling insert body 292 and are located adjacent to the periphery of the milling insert body 292 wherein these apertures can be considered to comprise a first set of apertures and a second set of apertures. Referring to FIG. 17, the first set of apertures comprises apertures 322, 324, 326 and 328, and the second set of apertures comprises apertures 332, 334, 336 and 338.

Milling insert 290 further includes one rake plate 342 that has an exterior surface 344 and an interior surface 346. One rake plate 342 contains a central aperture 348, as well as a plurality of passages (350, 352, 354, 356) located adjacent to the periphery of the one rake plate. Each one of these passages (350, 352, 354, 356) passes completely through the one rake plate 342. One rake plate 342 further contains a plurality of troughs (360, 362, 364, 366) (see FIG. 16A) wherein each one of the troughs is adjacent to one of the apertures.

Milling insert 290 further includes another rake plate 370 that has an exterior surface 372 and an interior surface 374. The other rake plate 370 contains a central aperture 376, as well as a plurality of passages (378, 380, 382, 384) located adjacent to the periphery of the one rake plate. Each one of these passages (378, 380, 382, 384) passes completely through the other rake plate 370. Other rake plate 370 further contains a plurality of troughs (388, 390, 392, 394) wherein each one of the troughs is adjacent to one of the apertures.

When the rake plates (342 and 370) are assembled to the mediate milling insert body 292, there are formed a first set of discrete internal channels wherein a representative channel of the first set of discrete channels is designated 400 in FIG. 17. The more detailed description of channel 400 will suffice for such a description of the other channels of the first set since they are essentially the same.

In reference to FIG. 17, internal channel 400 comprises peripheral aperture 328, passage 384 contained in the other rake plate 370 and the trough 366 contained in the one rake plate 342. The exterior opening for passage 384 functions as an inlet for the internal channel 400 through which coolant enters from the coolant source when the internal channel 400 is in fluid communication with the coolant source. When in this condition, coolant flows through passage 384 and peripheral aperture 328 and into trough 366 where it is directed over the notches 286 and away from the milling insert toward the vicinity of the cutting edge 310. It can thus be seen that internal channel 400 provides a pathway for coolant to flow so as to provide a direct spray of coolant in the vicinity of the corresponding cutting edge.

As can be appreciated, each one of the internal channels in the first set of discrete internal channels has an inlet in the other rake plate 370 and an outlet in the one rake plate 342. Each one of the channels of the first set of discrete internal channels has a corresponding one of the cutting edges (304, 306, 308, 310) adjacent to the one face 296. Referring to FIGS. 16 and 16A, the four interior channels of the first set of interior channels are described below.

The first one of the interior channels comprises passage 378 in the other rake plate 370, the peripheral aperture 322 in the mediate milling insert body and the trough 360 in the one rake plate 342. The first interior channel correspond to cutting edge 304. The second one of the interior channels comprises passage 380 in the other rake plate 370, the peripheral aperture 324 in the mediate milling insert body and the trough 362 in the one rake plate 342. The second interior channel corresponds to cutting edge 306. The third one of the interior channels comprises passage 382 in the other rake plate 370, the peripheral aperture 326 in the mediate milling insert body and the trough 364 in the one rake plate 342. The third one of the interior channels corresponds to cutting edge 308. The fourth one of the interior channels (which is illustrated as channel 400 in FIG. 17) comprises passage 384 in the other rake plate 370, the peripheral aperture 328 in the mediate milling insert body and the trough 366 in the one rake plate 342. The fourth interior channel correspond to cutting edge 310.

When the rake plates (342 and 370) are assembled to the mediate milling insert body 292, there is also formed a second set of discrete internal channels wherein a representative channel of the second set of discrete channels is designated 402 in FIG. 17. The more detailed description of channel 402 will suffice for such a description of the other channels of the second set since they are essentially the same.

In reference to FIG. 17, internal channel 402 comprises peripheral aperture 334, passage 352 contained in the one rake plate 342 and the trough 390 contained in the other rake plate 370. The exterior opening for passage 352 functions as an inlet for the internal channel 402 through which coolant enters from the coolant source when the internal channel 402 is in fluid communication with the coolant source. When in this condition, coolant flows through passage 352 and peripheral aperture 328 and into trough 390 where it is directed over the notches 286 and away from the milling insert toward the vicinity of the cutting edge 314. It can thus be seen that internal channel 402 provides a pathway for coolant to flow so as to provide a direct spray of coolant in the vicinity of the corresponding cutting edge.

As can be appreciated, each one of the internal channels in the second set of discrete internal channels has an inlet in the one rake plate 342 and an outlet in the other rake plate 370. Each one of the channels of the second set of discrete internal channels has a corresponding one of the cutting edges (312, 314, 316, 318) adjacent to the other face 298. Referring to FIGS. 16 and 16A, the four interior channels of the second set of interior channels are described below.

The first one of the interior channels (of the second set of channels) comprises passage 350 in the one rake plate 342, the peripheral aperture 332 in the mediate milling insert body and the trough 388 in the other rake plate 370. The first interior channel corresponds to cutting edge 312. The second one of the interior channels (which is illustrated as internal channel 402 in FIG. 12) comprises passage 352 in the one rake plate 342, the peripheral aperture 334 in the mediate milling insert body and the trough 390 in the other rake plate 370. The second interior channel corresponds to cutting edge 314. The third one of the interior channels comprises passage 354 in the one rake plate 342, the peripheral aperture 336 in the mediate milling insert body and the trough 392 in the other rake plate 370. The third one of the interior channels corresponds to cutting edge 316. The fourth one of the interior channels comprises passage 356 in the one rake plate 342, the peripheral aperture 338 in the mediate milling insert body and the trough 394 in the other rake plate 370. The fourth interior channel corresponds to cutting edge 318.

The above description shows that coolant is supplied to any one of the cutting edges that is selected to be in engagement with the workpiece. In this regard, when affixed to the pocket of a milling cutter body such as generally shown in FIG. 1, a threaded member passes through the central aperture 320, as well as a central passage in an optional shim (not illustrated), so as to engage a threaded bore in the seating surface of a pocket that carries a milling insert assembly that uses milling insert 290. The seating surface of the pocket that is generally parallel to the rake plates contains an opening to a coolant passage that is, in turn, in communication with the coolant source through the central coolant reservoir. The position on the seating surface of the opening to the coolant passage is such that the inlet to the internal channel corresponding to the selected (or engaged) cutting edge is in alignment with the opening to the coolant passage.

In operation, coolant is supplied through the internal channel to the selectively engaged cutting edge. When it is necessary to present a new cutting edge, the milling insert is indexed to another position to present the new cutting edge. When in the new position, the internal channel that corresponds to the new cutting edge is now in alignment, and hence, fluid communication with the opening of the coolant passage. Thus, coolant is supplied to the new cutting edge that is engagement with the workpiece.

Referring to FIGS. 19 through 22, there is shown still another specific embodiment of a milling insert generally designated as 410. Milling insert 410 has a milling insert body 412 that presents a peripheral flank surface 414 and a peripheral rake surface 416. Milling insert body 412 defines cutting edges (418, 420, 422, 424) at the intersection between the peripheral flank surface 414 and the peripheral rake surface 416. Milling insert body 412 has a bottom surface 426.

Milling insert body 412 contains a central aperture 428 that passes completely through the body. Milling insert body 412 contains a central cavity 430 that further contains troughs (432, 434, 436, 438). Milling insert body 412 contains a coolant passage (440, 442, 444, 446) adjacent to each one of the troughs (423, 434, 436, 438). A description of coolant passage 442 is sufficient for a description of the other coolant passages wherein coolant passage 442 has an inlet 448 and an outlet 450. Coolant enters the passage through the inlet and exits the passage through the outlet.

Milling insert 410 further includes a milling rake plate 470. Milling rake plate 470 has an exterior surface 472 and an interior surface 474, as well as contains a central aperture 476 therethrough.

Figure 23:
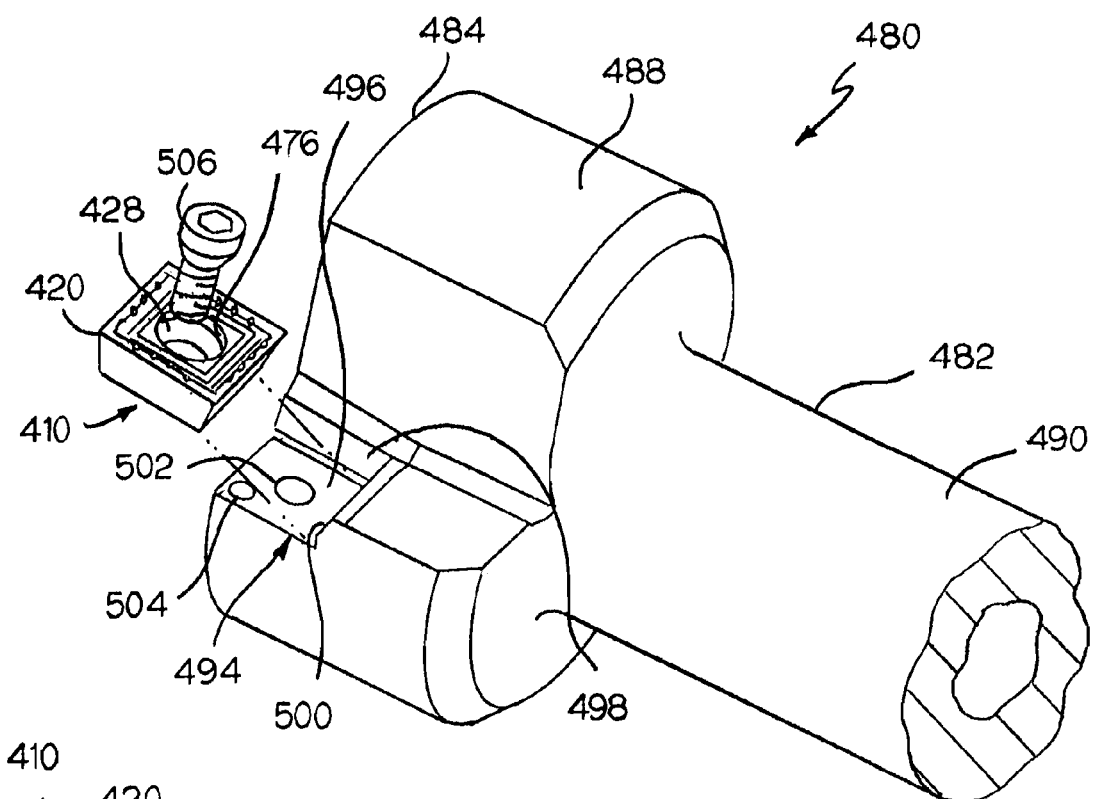
FIG. 23 is an isometric view of another specific embodiment of a milling cutter assembly showing the milling insert of FIGS. 19-22 exploded away from the pocket of the milling cutter body.
Figure 24:
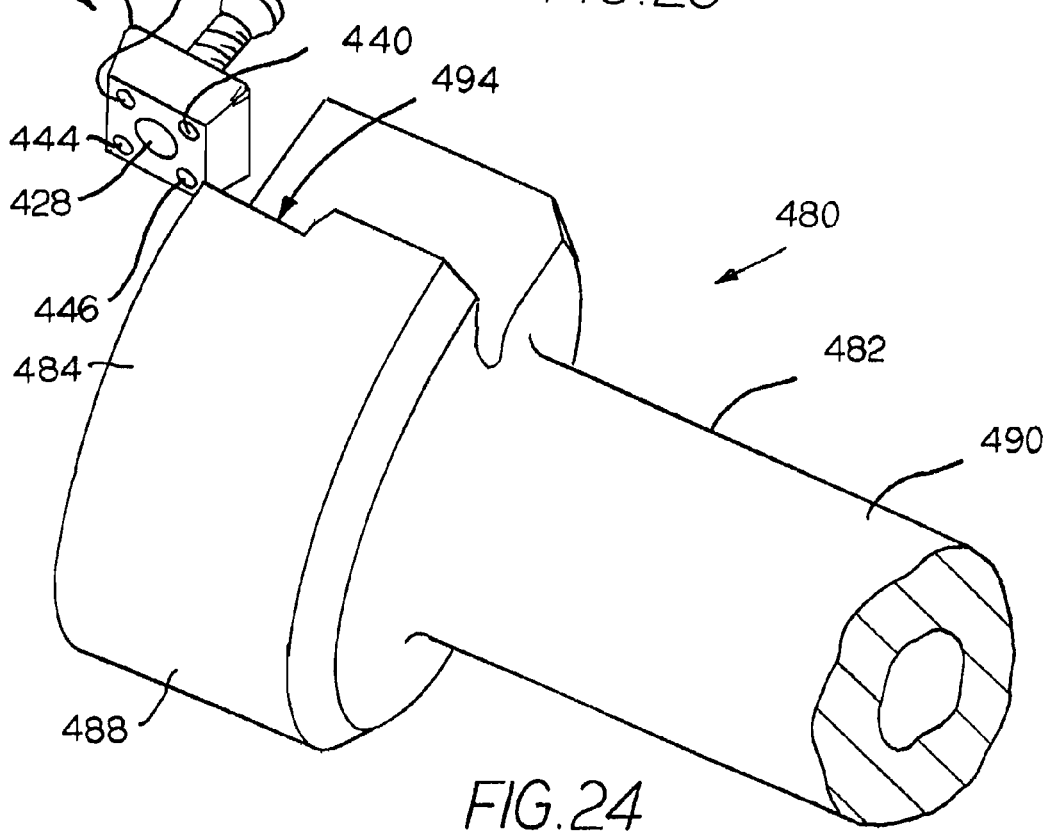
FIG. 24 is an isometric view of the specific embodiment of the milling cutter assembly of FIG. 23 wherein the milling cutter body is rotated so that the bottom surface of the milling inert is visible.

Milling insert 410 affixes to the pocket of the milling cutter body in a fashion generally like that for milling insert 290 in that a threaded member passes through the central aperture to engage a threaded bore in the seating surface of a pocket that carries a milling insert assembly that uses the milling insert. More specifically, FIGS. 23 and 24 show a milling cutter assembly generally designated as 480. Milling cutter assembly 480 includes a milling cutter body 482 that has an axial forward end 484 and an axial rearward end 486. There is a head portion 488 at the axial forward end 484 ad a shank 490 depends from the head portion 488. The head portion 488 contains a pocket 494 that has a bottom seating surface 496 and a pair of upstanding side seating surfaces 498 and 500. The head portion 488 contains a threaded hole (or aperture) 502 that opens in the bottom seating surface 496 of the pocket 494. The milling cutter body 482 contains a coolant passage 504 that opens at the bottom seating surface 496 of the pocket 494.

In reference to the attachment of the milling insert 410 to the milling cutter body 482, the milling insert 410 is positioned in the pocket 494 so that the central apertures (428 and 476) of the milling insert body 412 and rake plate 470, respectively, are in alignment with the threaded hole 502. The screw 506 is passed through the central apertures (428 and 476) and into engagement with the threaded hole 502 whereby the screw 505 is tightened down to secure the milling insert 410 to the milling cutter body 482.

It should be appreciated that the milling insert 410 is oriented in the pocket 494 so that a selected one of the cutting edges is positioned to be in engagement with the workpiece. In this regard and as shown in FIGS. 23-24, the milling insert 410 is oriented so that cutting edge 420 is in position to engage the workpiece and the corresponding coolant passage 442 is in alignment with the coolant passage 504 opening in the bottom seating surface 496. When in this position, coolant passes into the milling insert 410 via coolant passage 442 and flows through the milling insert 410 so as to exit in a spray adjacent to the cutting edge 420.

In operation, the coolant passage that corresponds to the cutting edge (420) selected to be in engagement with the workpiece is in alignment with the opening to the coolant passage in the seating surface. Coolant is supplied to the engaged cutting edge through the coolant passage 442 in the milling insert. When it is necessary to present a new cutting edge, the milling insert is indexed to another position to present the new cutting edge. When in the new position, the internal channel that corresponds to the new cutting edge is now in alignment, and hence, fluid communication with the opening of the coolant passage. Thus, coolant is supplied to the new cutting edge.

Figure 25:
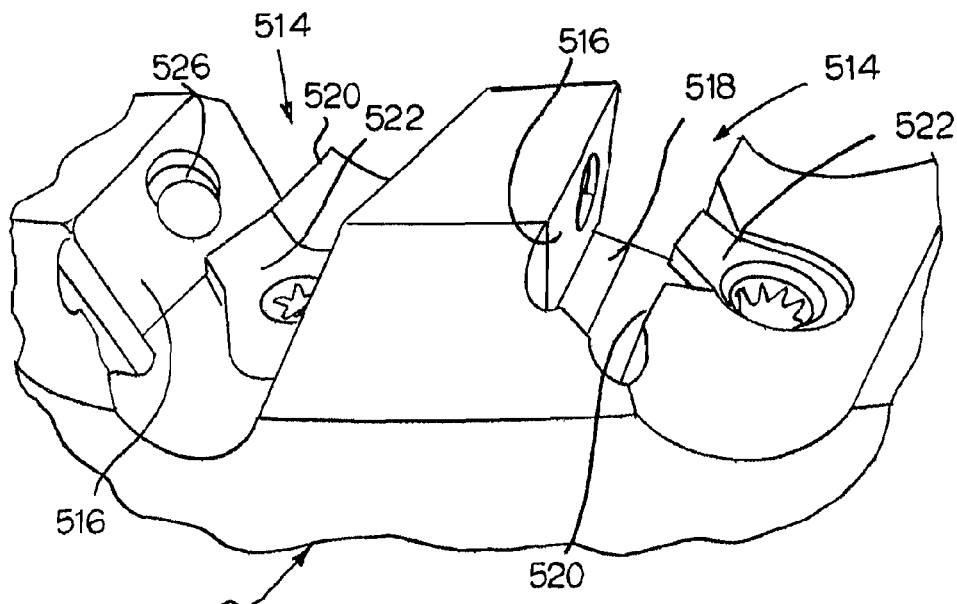
FIG. 25 is an isometric view of a portion of the milling cutter body of still another specific embodiment of a milling cutter assembly wherein a shim is not necessary, and the milling insert has been removed from the pocket.
Figure 26:
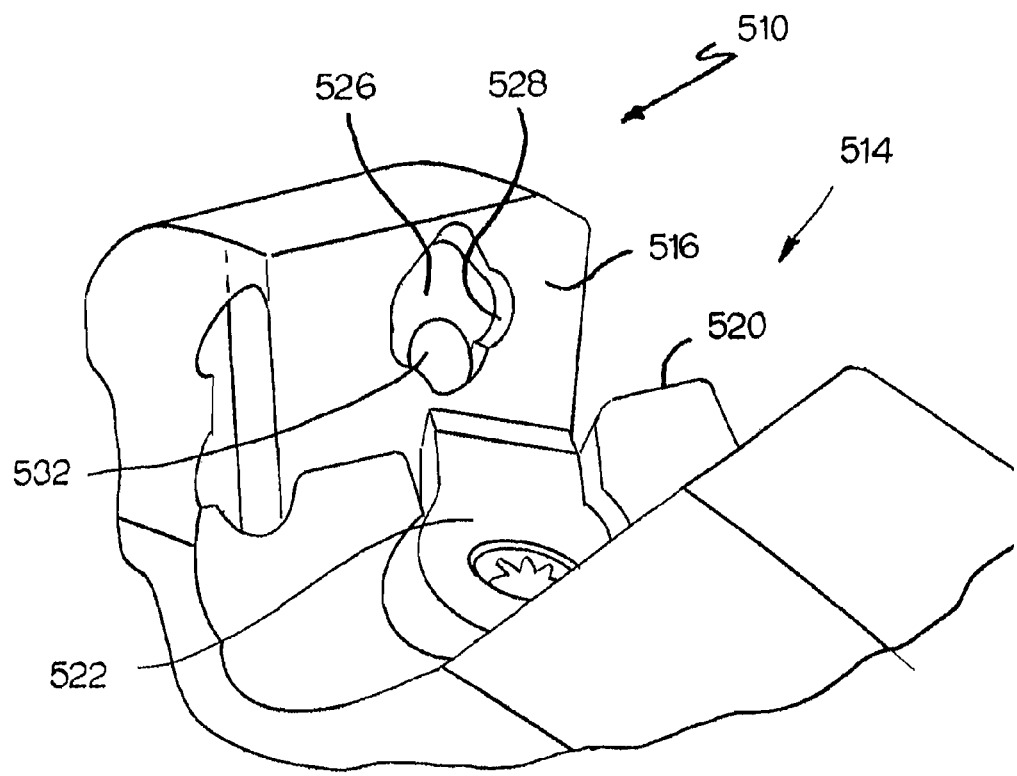
FIG. 26 is another isometric view of the pocket of the milling cutter body of FIG. 25.

Referring to the structure in FIGS. 25-26, there is shown another specific embodiment of a milling cutter body generally designated as 510. Milling cutter body 510 contains a plurality of pockets 514 at the periphery thereof. Each one of the pockets 514 has a side seating surface 516 and a bottom seating surface 518. Each pocket 514 also has a leading surface 520. A clamp 522 is secured to the milling cutter body 510 at a point rotationally ahead of the pocket 514, but close enough to the pocket 514 to be able to bias against the surface of a milling insert retained within the pocket 514. The side seating surface 516 contains a cut out portion 526 that surrounds the coolant passage 532 that opens at the side seating surface 516.

In reference to the attachment of the milling insert 170 in the pocket 514, the bottom surface 180 of the milling insert 170 is placed against the side seating surface 516 so that one of the lobes (202, 204, 206, 208) is in alignment with (or opens into) the volume defined by the cut out 526. The clamp 522 is positioned so that it acts against the milling insert 170 whereby upon being tightened, the clamp securely maintains the milling insert 170 in the pocket 514. Coolant passes into the milling insert 170 through the coolant passage 532 and the volume defined by cut out 526. Coolant then passes through the milling insert 170 as described hereinabove, and exits in a spray adjacent to the selected cutting edge that is in engagement with the workpiece.

The milling cutter assembly has a number of advantages because it provides coolant to the underneath side of the cutting edge at the interface of the cutting edge and the workpiece. As a result, the coolant provides for a reduction of the negative impact of the heat build-up at the milling insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

For the specific embodiments shown herein, it an be seen that the coolant exits at a location on the underneath side of the cutting edge at the interface of the cutting edge and the workpiece. As a result, the coolant provides for a reduction of the negative impact of the heat build-up at the milling insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

It is apparent that the present invention provides a milling cutter, as well as a milling insert, used for chipforming and material removal operations wherein there is an improved delivery of coolant to the interface between the milling insert and the workpiece. A number of advantages exist as a result of the improvement in the coolant delivery.

In this regard, the present invention provides a milling cutter, as well as a milling insert, used for chipforming and material removal operations wherein there is an improved delivery of coolant to the interface between the milling insert and the workpiece (i.e., the location on the workpiece where the chip is generated). As a result, the coolant provides for a reduction of the negative impact of the heat build-up at the milling insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A milling cutter for use in chipforming and material removal from a workpiece wherein coolant is supplied to the milling cutter from a coolant source, the milling cutter comprising:
    a milling cutter body containing a coolant reservoir, the milling cutter body further containing a pocket;
    said pocket being defined by a side seating surface, a bottom seating surface, and a leading seating surface;
    a pocket opening in the side seating surface;
    the milling cutter body containing a fluid passageway providing fluid communication between the coolant reservoir and the pocket opening;
    a cutting insert having a rake surface and a bottom surface, the cutting insert comprising at least one discrete cutting location;
    the cutting insert containing at least one distinct internal channel that corresponds to the cutting location, the internal channel having an inlet to receive coolant and an outlet to exit coolant, the outlet opening at the rake surface and being proximate to the cutting location, and the inlet opening at the bottom surface and being radial inward of the outlet; and
    the bottom surface of the cutting insert contacting the side seating surface whereby the inlet communicates with the pocket opening placing the internal channel in fluid communication with the coolant source.

2. The milling cutter according to claim 1 wherein the side seating surface containing a cut out portion in communication with the pocket opening.

3. The milling cutter according to claim 2 wherein the cutting insert having at least two of the distinct cutting locations and at least two of the discrete internal channels, each one of the internal channels corresponding to one of the cutting locations.

4. The milling cutter according to claim 3 wherein the cutting insert engaging the workpiece at an engaged one of the distinct cutting locations, and the cutting insert having an orientation in the pocket so the inlet of the internal channel corresponding to the engaged cutting location registers with the cut out portion thereby placing the internal channel corresponding to the engaged cutting location in fluid communication with the coolant source.

5. The milling cutter according to claim 4 wherein the inlet of the internal channel corresponding to the unengaged cutting location abutting the side seating surface whereby the internal channel corresponding to the unengaged cutting location being in substantial fluid isolation from the cut out portion and the coolant source.

6. The milling cutter according to claim 4 wherein the outlet of the internal channel corresponding to the engaged cutting location being oriented to provide a direct spray of coolant adjacent to the engaged cutting location.

7. The milling cutter according to claim 6 wherein the engaged cutting location being the sole cutting location to receive a direct spray of the coolant.

8. The milling cutter according to claim 2 wherein the cut out portion being offset from the pocket opening.

9. The milling cutter according to claim 1 the cutting insert further having a peripheral flank surface, and the cutting location comprising a discrete cutting edge formed at the intersection of the rake surface and the peripheral flank surface.

10. The milling cutter according to claim 1 further including a clamp attached to the leading seating surface, and the clamp contacting the cutting insert.

11. A milling cutter body for retaining a cutting insert that contains a distinct internal channel corresponding to a cutting location and the internal channel having an inlet to receive coolant and an outlet to exit coolant, the milling cutter body comprising:
    a coolant reservoir;
    a pocket, said pocket being defined by a side seating surface, a bottom seating surface, and a leading seating surface;
    a pocket opening in the side seating surface;
    a fluid passageway providing fluid communication between the coolant reservoir and the pocket opening; and
    the side seating surface containing a cut out portion in communication with the pocket opening, and when the cutting insert being received within the pocket, the inlet registering with the cut out portion to place the internal channel in fluid communication with the coolant reservoir.

12. The milling cutter body according to claim 11 wherein the cut out portion being offset from the pocket opening.

* * * * *